United States Patent
Collins

(10) Patent No.: US 10,665,110 B2
(45) Date of Patent: May 26, 2020

(54) AUTOMATED UN-MANNED AIR TRAFFIC CONTROL SYSTEM

(71) Applicant: Precision Hawk USA Inc., Raleigh, NC (US)

(72) Inventor: Tyler James Collins, Raleigh, NC (US)

(73) Assignee: PRECISION HAWK USA INC., Raleigh, NC (US)

( * ) Notice: Subject to any disclaimer, the term of this patent is extended or adjusted under 35 U.S.C. 154(b) by 21 days.

(21) Appl. No.: 15/875,845

(22) Filed: Jan. 19, 2018

(65) Prior Publication Data
US 2018/0158341 A1 Jun. 7, 2018

Related U.S. Application Data

(63) Continuation of application No. 14/847,910, filed on Sep. 8, 2015, now Pat. No. 9,875,657.

(60) Provisional application No. 62/139,272, filed on Mar. 27, 2015, provisional application No. 62/046,619, filed on Sep. 5, 2014.

(51) Int. Cl.
| | |
|---|---|
| G08G 5/00 | (2006.01) |
| G01S 13/933 | (2020.01) |
| B64C 39/02 | (2006.01) |
| G01S 17/933 | (2020.01) |
| G01S 15/93 | (2020.01) |
| G05D 1/10 | (2006.01) |
| G08G 5/04 | (2006.01) |

(52) U.S. Cl.
CPC ......... *G08G 5/0008* (2013.01); *B64C 39/024* (2013.01); *G01S 13/933* (2020.01); *G01S 15/93* (2013.01); *G01S 17/933* (2013.01); *G05D 1/101* (2013.01); *G08G 5/0013* (2013.01); *G08G 5/0039* (2013.01); *G08G 5/0069* (2013.01); *G08G 5/0078* (2013.01); *G08G 5/0086* (2013.01); *G08G 5/0091* (2013.01); *G08G 5/045* (2013.01)

(58) Field of Classification Search
USPC ........................................................ 701/14
See application file for complete search history.

(56) References Cited

U.S. PATENT DOCUMENTS

| | | | |
|---|---|---|---|
| 7,269,513 B2 | 9/2007 | Herwitz | |
| 7,864,096 B2 | 1/2011 | Stayton | |
| 8,538,673 B2 | 9/2013 | Sislak | |
| 8,781,650 B2 * | 7/2014 | Downs | G05D 1/0027 701/117 |
| 8,874,360 B2 * | 10/2014 | Klinger | G08G 1/162 701/22 |

(Continued)

FOREIGN PATENT DOCUMENTS

KR 20110095637 A 8/2011

OTHER PUBLICATIONS

International Searching Authority, "International Search Report and Written Opinion," issued for application No. PCT/US15/48960, dated Jun. 2, 2016, 7 pages.

*Primary Examiner* — Tyler D Paige
(74) *Attorney, Agent, or Firm* — Loeb & Loeb LLP

(57) ABSTRACT

A low flying unmanned vehicle is disclosed that may be able to determine whether a collision is possible and may take evasive action in response to the possible collision. The vehicle may wirelessly communicate and may use a standard protocol such that a variety of additional objects may be taken into account when determining the possible collision risk.

21 Claims, 15 Drawing Sheets

(56) References Cited

U.S. PATENT DOCUMENTS

| | | | |
|---|---|---|---|
| 8,897,770 B1 | 11/2014 | Frolov | |
| 9,087,451 B1 * | 7/2015 | Jarrell | G08G 5/0069 |
| 9,412,278 B1 * | 8/2016 | Gong | G06F 16/29 |
| 9,466,218 B2 * | 10/2016 | Jarrell | G08G 5/0069 |
| 9,654,476 B2 * | 5/2017 | Lemmey | G06F 21/62 |
| 9,875,657 B2 * | 1/2018 | Collins | B64C 39/024 |
| 2003/0110028 A1 | 6/2003 | Bush | |
| 2006/0085106 A1 | 4/2006 | Gaudiano et al. | |
| 2008/0033604 A1 | 2/2008 | Margolin | |
| 2009/0125221 A1 | 5/2009 | Estkowski | |
| 2010/0121575 A1 | 5/2010 | Aldridge et al. | |
| 2010/0131121 A1 * | 5/2010 | Gerlock | G08G 5/0013 |
| | | | 701/2 |
| 2010/0292874 A1 | 11/2010 | Duggan | |
| 2011/0178658 A1 * | 7/2011 | Kotaba | G01C 21/005 |
| | | | 701/3 |
| 2012/0158219 A1 | 6/2012 | Durling | |
| 2012/0290152 A1 | 11/2012 | Cheung et al. | |
| 2013/0317669 A1 * | 11/2013 | Jiang | G01S 3/80 |
| | | | 701/3 |
| 2014/0081505 A1 * | 3/2014 | Klinger | G08G 1/162 |
| | | | 701/25 |
| 2014/0139366 A1 | 5/2014 | Moses | |
| 2014/0172193 A1 | 6/2014 | Levien | |
| 2017/0148328 A1 * | 5/2017 | Chan | G08G 5/006 |

* cited by examiner

US 10,665,110 B2

AUTOMATED UN-MANNED AIR TRAFFIC CONTROL SYSTEM

CROSS REFERENCE TO RELATED APPLICATIONS

This application claims the benefit of, and priority to, U.S. Non-Provisional application Ser. No. 14/847,910, filed Sep. 8, 2015, titled "Automated Un-Manned Air Traffic Control System," which claims benefit of, and priority to, U.S. Prov. App. Ser. No. 62/046,619, filed Sep. 5, 2014, titled "Low Flying Collision Detection and Avoidance," and U.S. Prov. App. Ser. No. 62/139,272, filed Mar. 27, 2015, titled "Low Flying Collision Detection, Avoidance and Return System", the content of each of which is incorporated herein by reference in its entirety.

BACKGROUND

Low flying unmanned vehicles have become more common and have more and more uses. As low flying vehicles become more common, the likelihood of collisions with trees, commercial airliners, buildings, and other unmanned vehicles becomes more likely. Trying to avoid collisions becomes more difficult as vehicles do not communicate with each other or FAA air traffic controllers and may take evasive action which made make collisions more probable rather than less likely.

SUMMARY

A low flying unmanned vehicle is disclosed that may be able to determine whether a collision is possible and may take evasive action in response to the possible collision. The vehicle may wirelessly communicate (e.g., using cellular, satellite, WiFi, WiMax, etc. communication) and may use a standard protocol such that a variety of additional objects may be taken into account when determining the possible collision risk.

In operation, the vehicle may receive flight data from one or more objects, may determine the location of the vehicles at a plurality of points in time in the future and may determine if a collision is probable. If a collision is probable, evasive data may be communicated to the vehicle. The flight data may be from a variety of vehicles, including commercial aircraft and other unmanned vehicles.

DETAILED DESCRIPTION

At a high level, a low flying unmanned vehicle 100 is disclosed that may be able to determine whether a collision is possible and may take evasive action in response to the possible collision. The vehicle 100 may wirelessly communicate (e.g., using cellular, satellite, WiFi, WiMax, etc. communication) and may use a standard protocol such that a variety of additional objects 111 may be taken into account when determining the possible collision risk.

Figure 1:
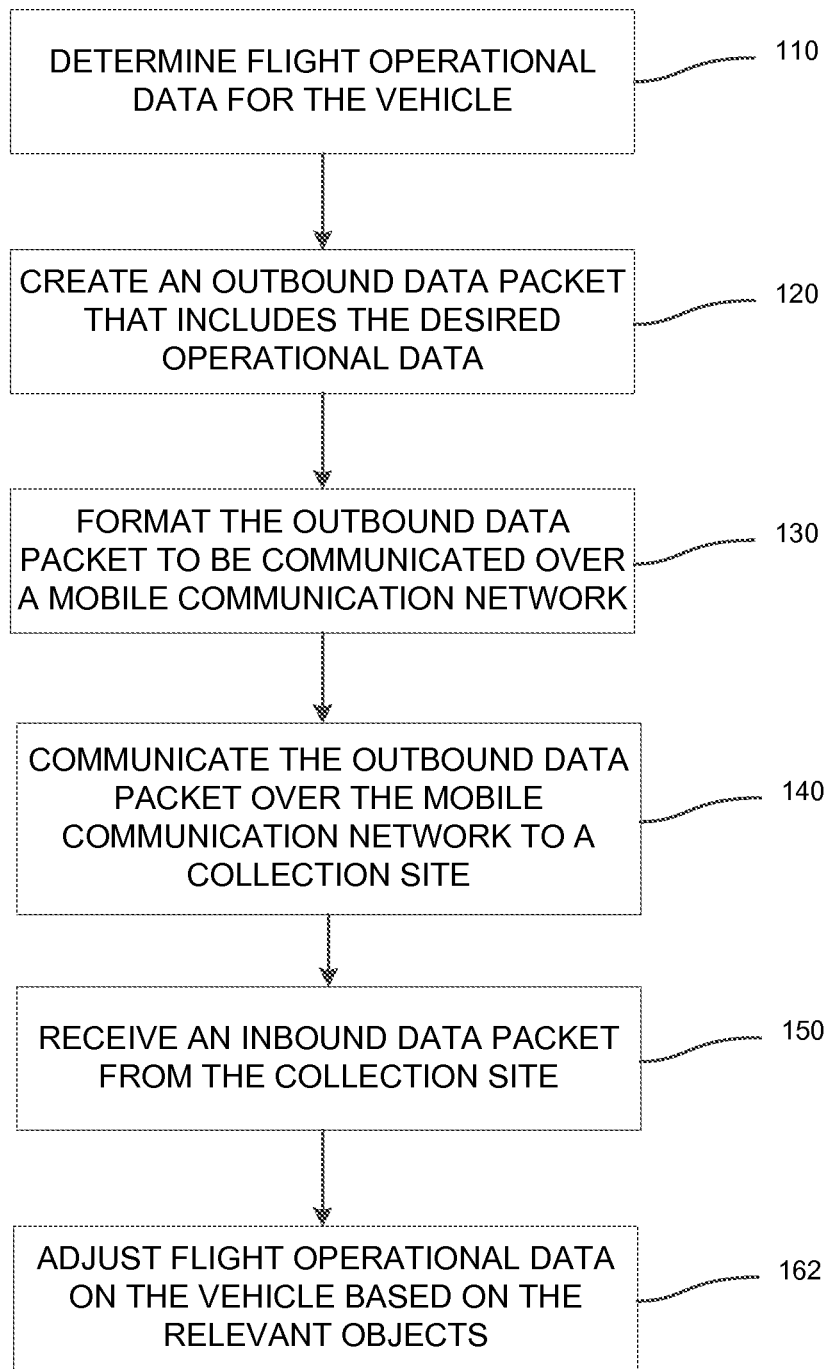
FIG. 1 may illustrate a method of information reporting and avoidance for a low flying unmanned vehicle.

FIG. 1 may illustrate a method of information reporting and avoidance for a low flying unmanned vehicle 100. The vehicle 100 may be an airplane or flying vehicle 100 which is too small to contain an adult human but may be small and light enough to be carried by an adult human. Further, the vehicle 100 may be of a size that it might fit into a standard van or the truck of a standard car. In addition, the device may be modular such that parts of the device may be easily removed and reattached. For example, the wings may be connected and disconnected in a manner that the wings are securely attached during flight but may be disconnected during travel to and from a location to make transporting the device easier. Similarly, the tail or computing system may be removed to allow easier transportation.

Figure 3:
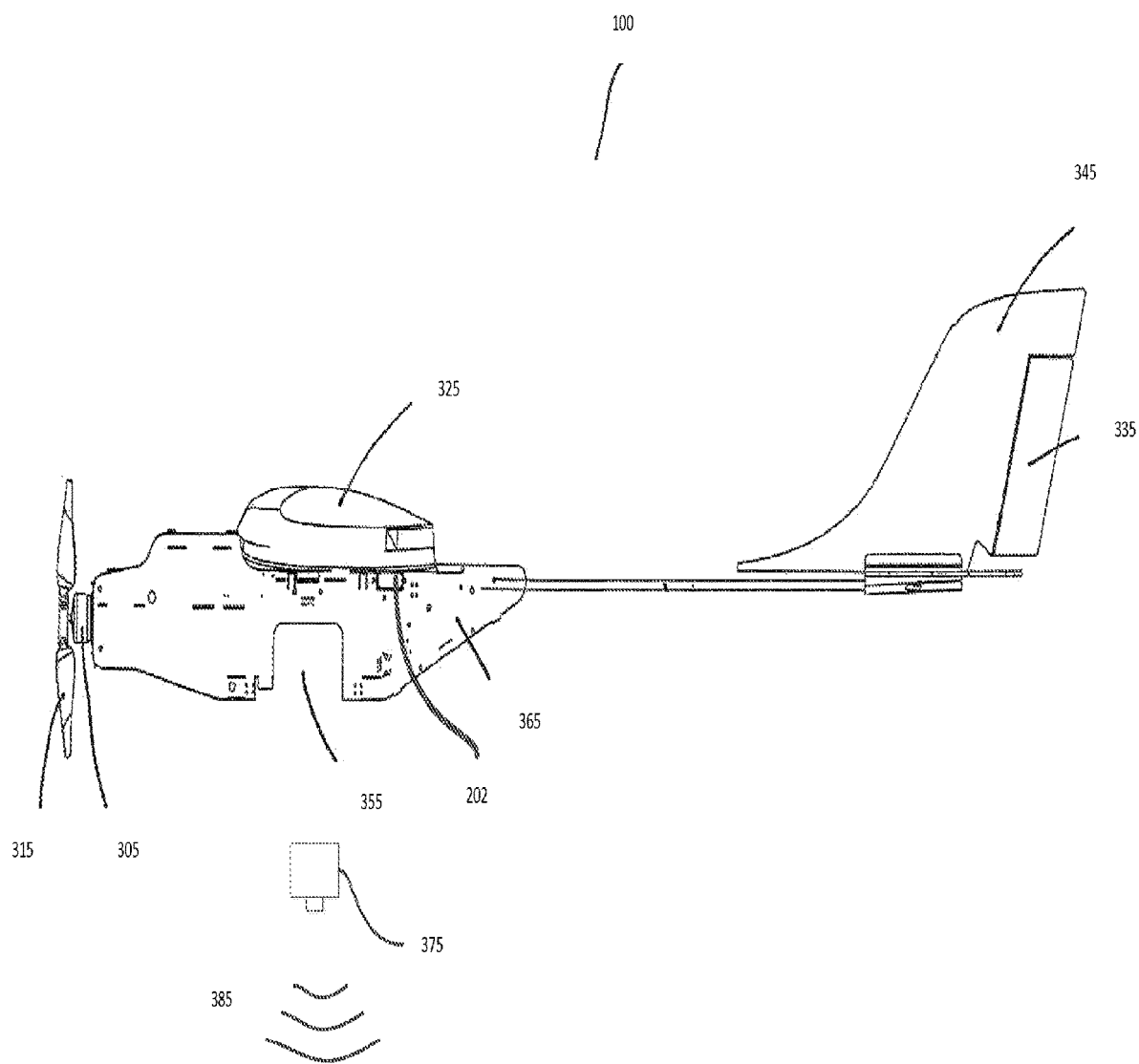
FIG. 3 may illustrate that the processor and memory may be mounted on a circuit board and the circuit board may be a load bearing member of the vehicle.

Referring briefly to FIG. 3, the vehicle 100 may have a propulsion device such as a gas motor or an electric motor 305 which may be connected to a propeller 315. The vehicle 100 also may have height adjustments through adjustable wings 325 and directional adjustments through a rudder 335 on a rear stabilizer 345. It may have a payload bay 355 that may be able to accept a variety of different sensors such as cameras and video devices. It may be able to land and, in some embodiments, the propellers may rotate to allow for vertical take-off and landing. In other embodiments, the vehicle 100 may have landing gear which may be retractable or permanent. A sample vehicle 100 may be described in U.S. patent application Ser. No. 13/892,358 filed May 13, 2013, which is incorporated by reference in all aspects.

By low flying, the vehicle 100 may be designed to stay below 1,000 feet for example and not limitation. The vehicle 100 may be designed to stay below the flight path of traditional aircraft in most situations. In some embodiments, the vehicle 100 may fly higher depending on the purpose of the flight, the surrounding conditions and other environmental factors.

The vehicle 100 may be unmanned. It may be flown be remote control or it may have intelligence and may fly according to a programmed flight path. In addition, it may execute a combination of a preprogrammed flight path and remote control. Further, in the described embodiment, the vehicle 100 may have intelligence to receive data and adjust its flight path in response to the received data.

Figure 2A:
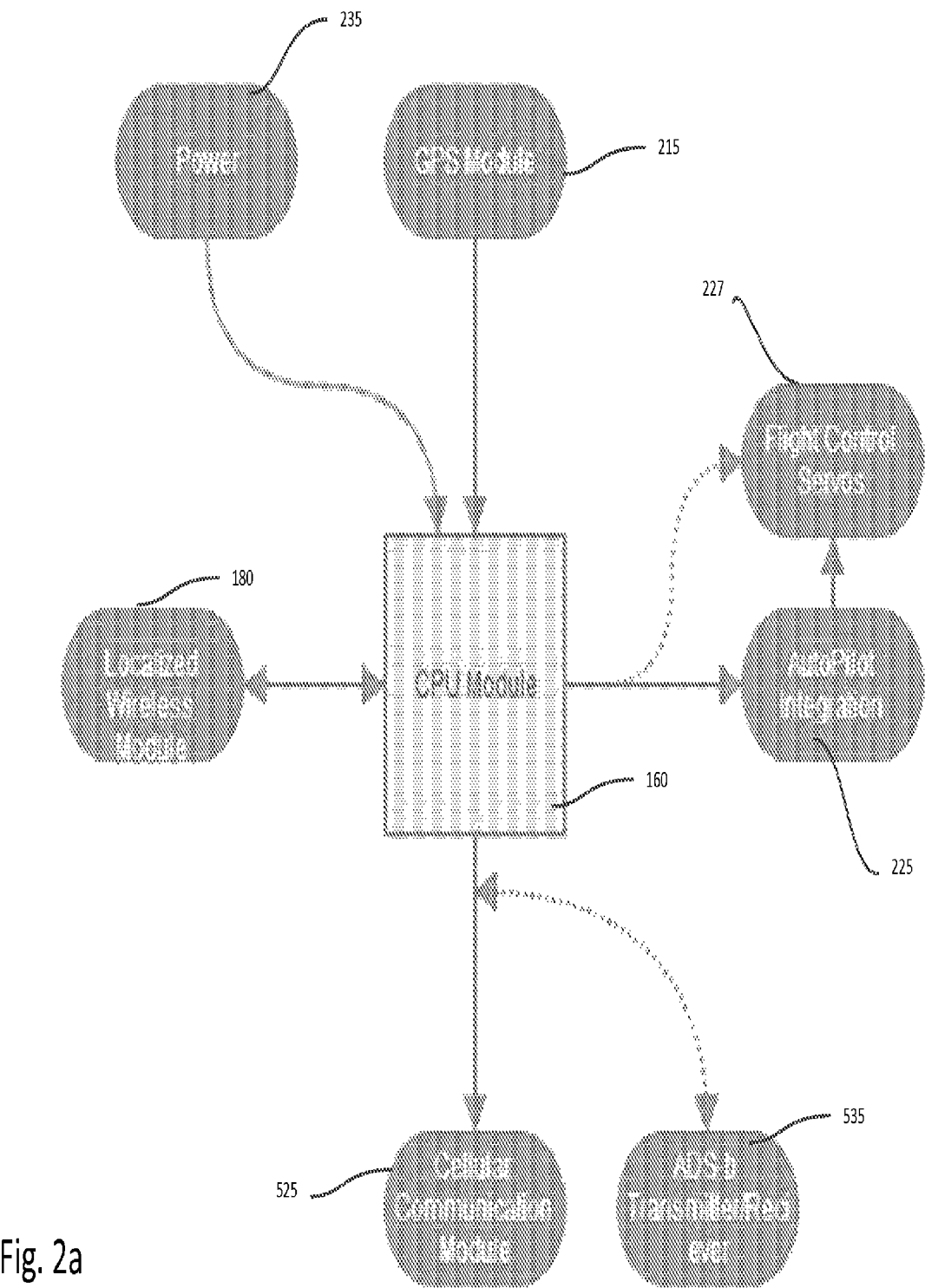
FIG. 2a may illustrate that a vehicle may have a processor and related computing equipment to control the path and course of the vehicle.
Figure 2B:
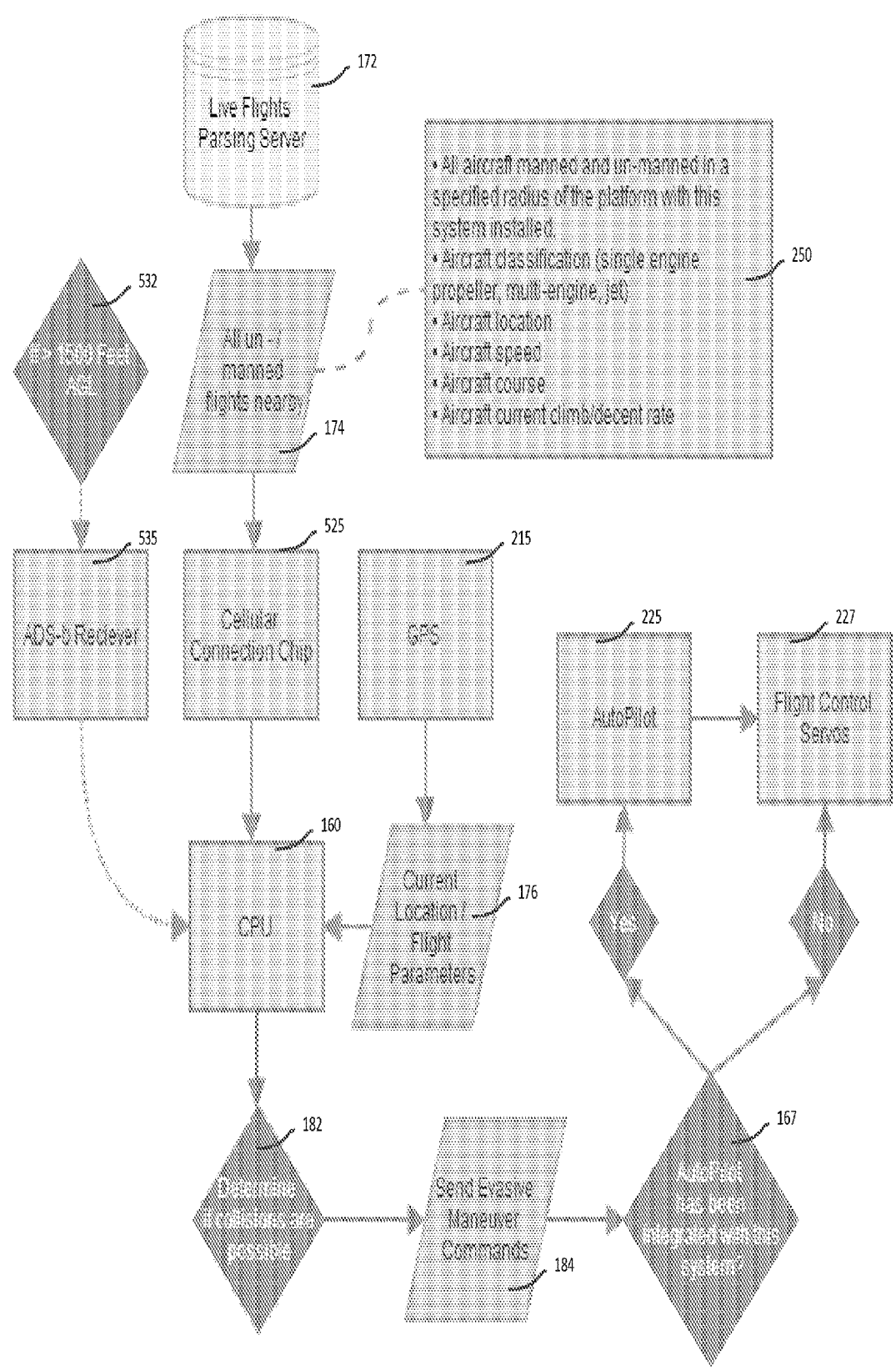
FIG. 2b may illustrate that the vehicle may have a processor and related computing equipment to control the path and course of the vehicle.

As illustrated in FIG. 2, the vehicle 100 may have a processor 202 and related computing equipment to control the path and course of the vehicle. The processor 202 may be physically configured to execute instructions that may be stored in a non-transitory memory. As illustrated in FIG. 3, the processor 202 and memory may be mounted on a circuit board 365 and the circuit board 365 may be a load bearing member of the vehicle.

Referring again to FIG. 1, at block 110, flight operational data for the vehicle 100 may be determined. Logically, a flying vehicle 100 may collect a significant amount of flight operational data. In some embodiments, the flight operation data 250 may include a vehicle identifier, a present vehicle position, a present vehicle airspeed and a present vehicle heading. Some sample operational data may be illustrated in FIG. 2b. The operational data 250 described is merely exemplary and is not meant to be limiting.

The vehicle identifier may be a unique code used to identify the vehicle 100. Traditional aviation vehicle 100 may have unique identifiers such as serial numbers and serial numbers may also be used as part of the vehicle identifier. In addition, vehicles often have a code name applied to them such as TWA 1456 and a similar naming function may be used to name the vehicles discussed herein. Further, other combinations and naming conventions may be possible and are contemplated.

A present vehicle 100 position may be a location in space and may be reported using GPS coordinates. In other embodiments, an aerospace coordinate system may be used such as the Aerospace Blockset coordinate system, other x, y, z coordinate systems such as north east down coordinates, Earth-centered inertial systems, systems used by AC3D systems, etc. In yet another embodiment, the vehicle 100 position may be reported in relation to a set point such as a radio tower, a building, etc.

The present airspeed of vehicle 100 may simply be an indication of velocity such as in miles per hour. In another embodiment, the airspeed may also include other measures such as kilometers per hour or meters per minute.

The present heading of vehicle 100 may indicate a heading or direction of the vehicle. The heading may be in terms of degree off north or degrees from a fixed location. In some embodiments, the heading may be user defined.

Figure 5A:
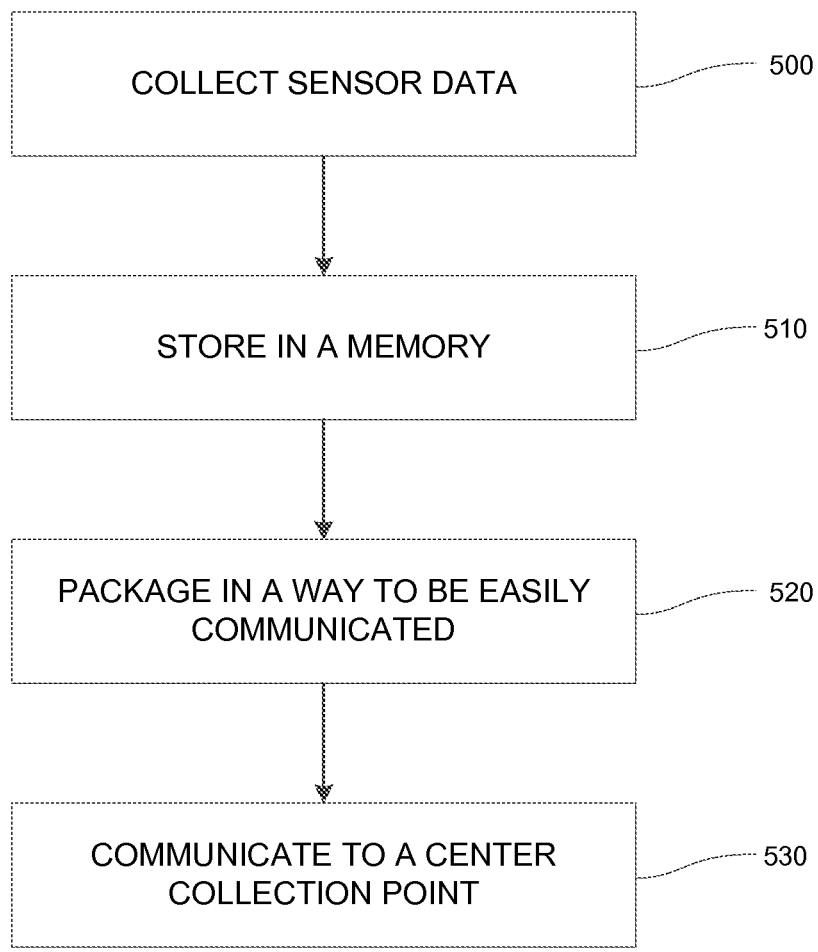
FIG. 5a may illustrate a method of collecting and communicating additional data.
Figure 5B:
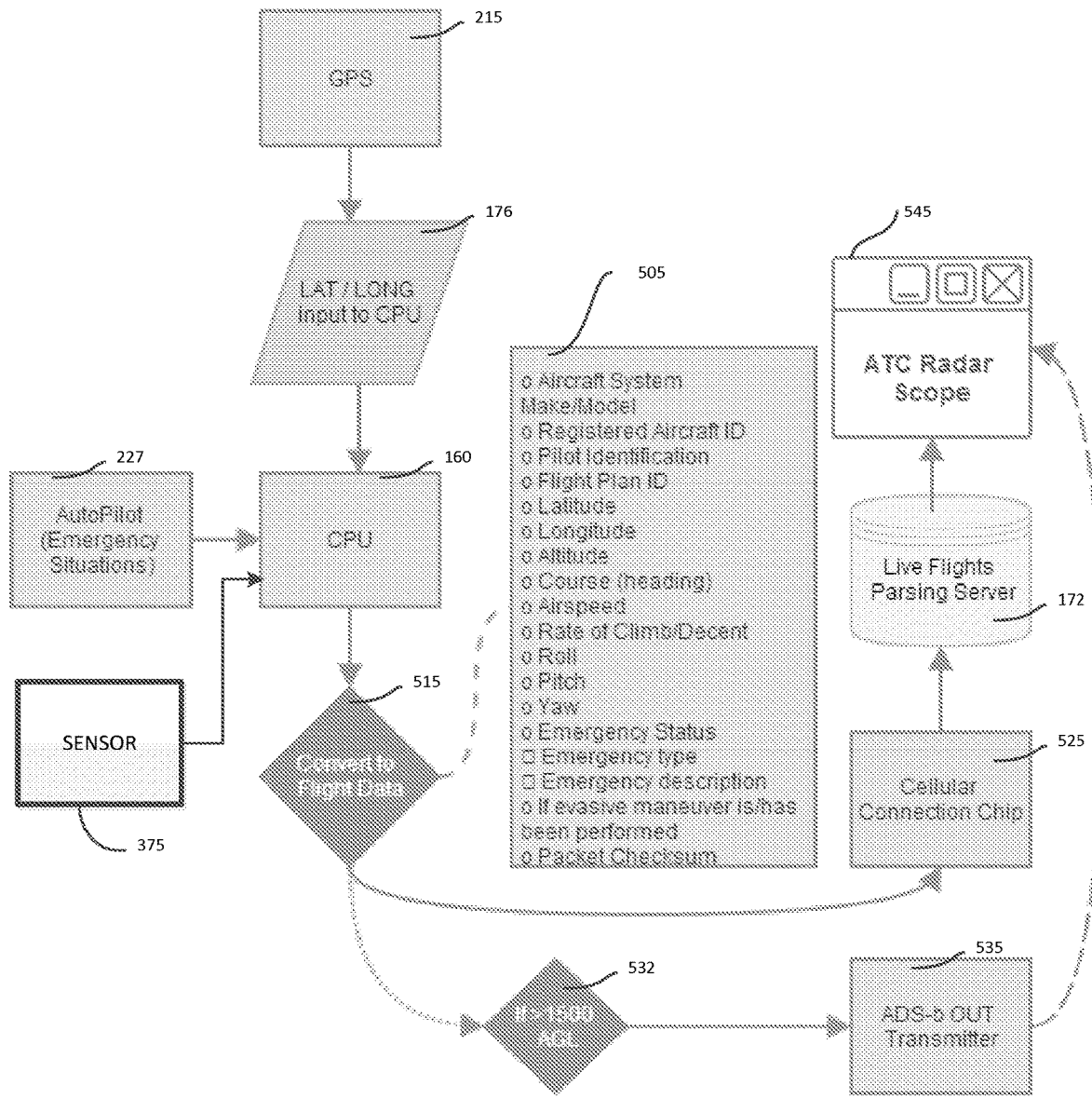
FIG. 5b may illustrate equipment that may be used to collect the additional data.

In some embodiments, there may be additional flight operational data 505 (FIG. 5b). The additional data 505 may be communicated more infrequently, such as at the start of a flight or once a time period, such as once every ten minutes. In other embodiments, the additional data 505 may be communicated just as frequently as the operational flight 250 data already described. Some of the additional data 505 may be communicated more frequently than other additional data 505. The additional flight data 505 may include planned operation data, where the planned operation data may include a planned vehicle 100 position, a planned vehicle 100 airspeed and a planned heading. Logically, the planned additional operational data may be for a limited time horizon as trying to communicate all future planned data may be difficult. In addition, the additional data 505 may include an item containing planned waypoints. Further, the planned route as it is stored onboard the aircraft may be viewed by an operator or remotely on a computer in communication with the vehicle 100 or the central storage device.

The additional operational data 505 may also include a pilot identifier. The pilot may be the person that is monitoring the flight, may be the person that programmed the flight or may be the owner of the vehicle. The pilot identifier may be a name, a number, an alpha-numeric combination or other code that may be used to identify a person responsible for the flight. The additional operational data 505 may also include a flight plan identifier. The flight plan identifier may be a code that is used to identify projected path of a flight. The code may be unique for a time period and the other intended operational details of the flight may be accessed by accessing a database using the flight plan.

The additional operational data 505 may also include a current latitude and longitude of the device. The latitude and longitude may be used to quickly identify the location of the device. Further, the additional operational data 505 may include the present altitude of the device, a rate of climb or decent of the device, a roll, pitch and yaw of the device. Such additional operational data 505 may be used to more finely track the location of the device and where the device will be in a point in time in the future. Again, not all the additional operational data 505 may be communicated at all times and some of the additional operational data 505 may be communicated more often than other additional operational data 505. Finally, the additional operational data 505 may include any emergency status, an emergency type, an emergency description, whether an evasive maneuver has been performed and a packet checksum which may be used to ensure that a communication has been accurately communicated and accurately received.

Figure 4A:
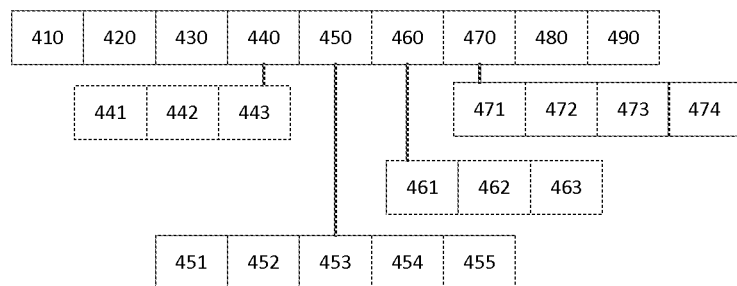
FIG. 4a may illustrate a sample outbound packet.

Referring again to FIG. 1, at block 120 an outbound data packet may be created that may include the desired operational data. The format of the outbound packet may follow a common pattern and the pattern may be predetermined. In some embodiments, the outbound packet may be in the form of an application programming interface (API) that may be expected by a central collection service. A sample outbound packet may be illustrated in FIG. 4a and may be described below.

Sample Packet (OutBound)
1. Randomized Packet ID (410)
2. Date/Time (420)
3. Flight ID (per flight identifier) (430)
4. Pilot Information (440)
   a. Name (441)
   b. Contact info (442)
   c. Credentials (443)
5. Aircraft Information (450)
   a. Make (451)
   b. Model (452)
   c. Weight (453)
   d. Category (454)
   e. Tail Number (455)
6. Flight Plan information (460)
   a. Flight plan ID (461)
   b. Planned altitudes (462)
   c. Planed flight path (463)
7. Live Telemetry Information (470)
   a. Location (471)
   b. Speed (472)
   c. Heading (473)
   d. Altitude (474)
8. Additional Information (480)
   a. May contain a number of pre-defined optional parameters (Emergency information, etc. . . . )
9. Checksum (490)

Figure 4B:
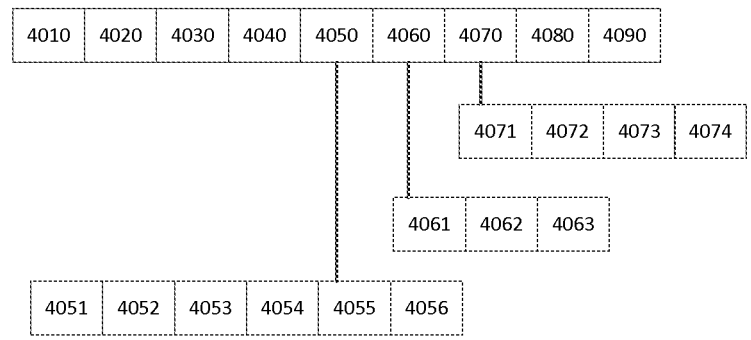
FIG. 4b may illustrate a sample inbound packet.

A sample inbound packet may be illustrated in FIG. 4b and is described below.
1. Randomized Packet ID (4010)
2. Date/Time (4020)
3. Targeted flight number (4030)

4. Targeted tail number (4040)

5. Potential air vehicle obstacles (sent in array for scalability) (4050)
   a. Location (4051)
   b. Speed (4052)
   c. Altitude (4053)
   d. Heading (4054)
   e. Climb/decent rate (4055)
   f. Aircraft classification (4056)

6. Potential ground obstacle (sent in array for scalability) (4060)
   a. Location (4061)
   b. Altitude (4062)

7. ATC instruction Information (4070)
   a. Land (4071)
   b. Terminate Flight (4072)
   c. Adjust altitude (4073)

8. Additional Information (4080)
   a. May contain a number of pre-defined optional parameters (Emergency information, etc. . . . )

9. Checksum (4090)

The length and format of the various elements of the inbound and outbound packets may be many and varied. For example, element 440 may be an array of data or may be a given set of elements. In addition, the order of the data elements may vary. Further, not every packet may be the same format as an emergency packet may be short while a change of course packet may be large. Of course, the outbound data packets may be encrypted. The encryption may take on a variety of forms and may include key exchange encryption.

In some embodiments, the outbound packet may be formatted such that traditional aviation services may be able to receive and parse the packets if desired. The outbound packet may contain additional information to indicate that the vehicle 100 is a low flying unmanned vehicle 100.

In some embodiments, the vehicle 100 may have one or more sensors 375 that may collect sensor data. FIG. 5a may illustrate a method of collecting and communicating additional data and FIG. 5b may illustrate the equipment that may be used to collect the sensor data 385. Similar to the operational data, the sensor data 385 may be collected at block 500, stored in a memory at block 510, packaged in a way to be easily communicated at block 520 and communicated to a center collection point at block 530.

Sensor data 385 may be a variety of data. As explained in U.S. patent application Ser. No. 13/892,358, which is incorporated by reference, the sensors 375 may be plugged and exchanged into the circuit board 375 and a plurality of sensors 375 may be plugged into the same circuit board 365 at the same time. The sensor 375 may be placed in the payload bay 355 or in other locations as needed. Some sample sensors 375 (and not limitations) include traditional image sensors, sensors of ranges outside human vision such as infrared, sound sensors, light sensors, LIDAR sensors, ultrasound sensors, etc.

In some embodiments, the sensor data 385 may be communicated in the same format as the operational data 250. In other embodiments, the sensor data 385 may be communicated in a separate format than the operational data. Logically, traditional air traffic networks may have little or no use for sensor data 385 meaning such data may be communicated in a different frequency in a different manner than operational data 250 to make it easier for the sensor data 385 to be ignored.

Figure 6:
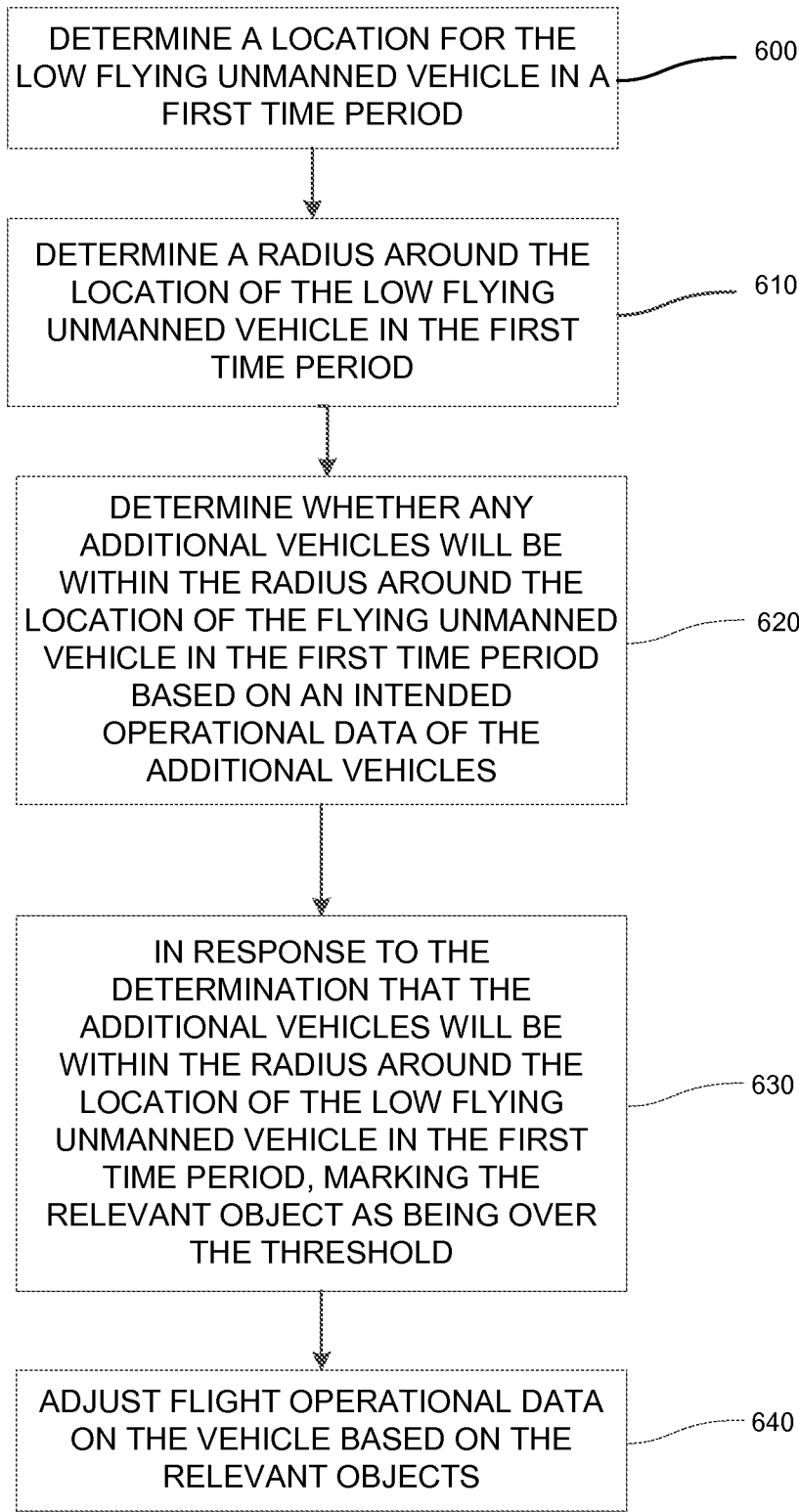
FIG. 6 may illustrate one way to determine whether an object is a relevant object worthy of reporting to a central collection point.
Figure 8:
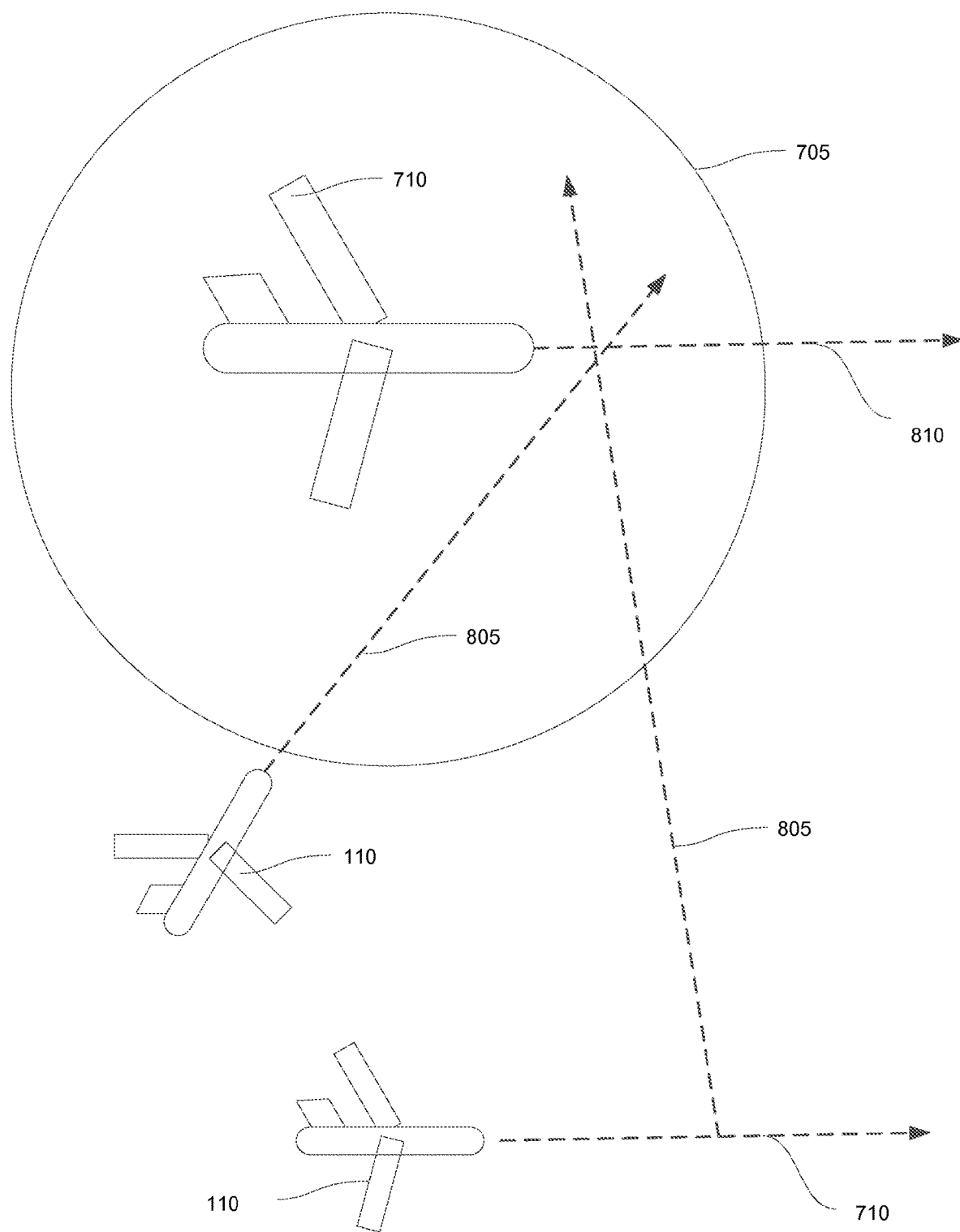
FIG. 8 may illustrate flight paths of vehicles.

The sensor data 385 may be analyzed for relevant objects and the relevant objects may be communicated to a central collection point. The relevant objects may be determined in a variety of ways. In one embodiment, relevant objects may be determined to be over a threshold of relevance. FIG. 6 may illustrate one way to determine whether an object is relevant object worthy of reporting to the central collection point and FIG. 8 may illustrate a plurality of objects.

At block 600, a location for the low flying unmanned vehicle 100 may be determined in a first time period. At block 610, a radius 705 around the location of the low flying unmanned vehicle 100 in the first time period may be determined. The radius 705 may vary depending on a variety of factors. In some embodiments, the radius 705 may be greater if the vehicle 100 is traveling at a high rate of speed such that the vehicle 100 may encounter other vehicles in a short period of time. Similarly, the radius 705 may be greater if other nearby objects 110 are moving at high rates of speed such that the vehicle 100 may encounter other vehicles 110 in a short period of time.

At block 620, it may be determined whether any additional vehicles 110 will be within the radius 705 around the location of the flying unmanned vehicle 100 in the first time period based on an intended operational data of the additional vehicles 110. For example, the additional time period may be 60 seconds.

Below is a pseudo code example of the vehicle 100 determining whether any additional vehicles will be within the radius 705. In an example, the vehicle 100 may search for nearby objects, referred to as "aggressors", and list the aggressors in a table as set forth in the below pseudo code.

Receive Possible Aggressor Table
getNearObjects( )

The vehicle 100 may use radar, GPS, or any other technology to locate vehicles that are within a predetermined distance (e.g., within 10 miles).

The vehicle 100 may perform a process similar to the below pseudo code to determine whether any of the identified nearby objects may be within the radius 705 in a particular time period. For example, the vehicle 100 may determine the current location of itself relative to each object, determine a radial distance in latitude and longitude between itself and each object, and use the radial distance to determine a current distance between itself and each object considering the curvature of the earth.

```
Receive Possible Aggressor Table
getNearObjects( )
For each Object in getNearObjects
Data Input
currentObject.Latitude=35.882234
currentObject.Longitude=-78.788222
currentObject.Altitude=30# meters
currentObject.Speed=16# meters/sec
currentObject.Track=93.6
currentObject.ID=4923# Identifier assigned to Vehicle 100
AggressorObject.Latitude=35.866864
AggressorObject.Longitude=-78.799637
AggressorObject.Altitude=50# meters
AggressorObject.Speed=18# meters/sec
AggressorObject.Track=103.59
AggressorObject.ID=13830# coded UAV ID
uavFenceRadius.Critical=1437.38# meters
uavFenceRadius.Warning=2046.72# meters
Calculate_Distance (currentObject, AggressorObject)
constR=6371000.0# radius of earth in meters
phi_1=radians(currentObject.Latitude)
phi_2=radians(AggressorObject.Latitude)
``` delta_phi=radians(AggressorObject.Latitude−currentObject.Latitude)
delta_lambda=radians(AggressorObject.Longitude−currentObject.Longitude)

The vehicle 100 may use delta_phi and delta_lambda to determine a distance between itself and each vehicle based on the curvature of the earth. This distance is referenced as "ResultRange" in the below pseudo code.

At block 630, in response to the determination that the additional vehicles 110 will be within the radius around the location of the low flying unmanned vehicle 100 in the first time period based on the intended path of the additional vehicles 110, the relevant object may be determined as being over the threshold. Below is a pseudo code example for determining whether an object is determined to be over the threshold. For example, different thresholds may be set up based on how near an additional vehicle 110 is to vehicle 100. The different thresholds may be used by vehicle 100 to determine whether to issue a warning or whether to take evasive maneuvers. Evasive maneuvers may include the vehicle 100 determining a safe location and causing the vehicle to move toward the safe location.

Check_Aggressor (ResultRange, uavFenceRadius)
    If ResultRange<uavFenceRadius.Critical
    safeLocation.Latitude=getSafeLocation.Latitude
    safeLocation.Longitude=getSafeLocation.Longtitude
    logOverrideEnabled( )
    notifyOverrideEnabled( )
    overrideToSafeLocation( )
    If ResultRange<uavFenceRadius.Warning
    logOverrideWarning( )
    notifyOverrideEnabled( )

Figure 7:
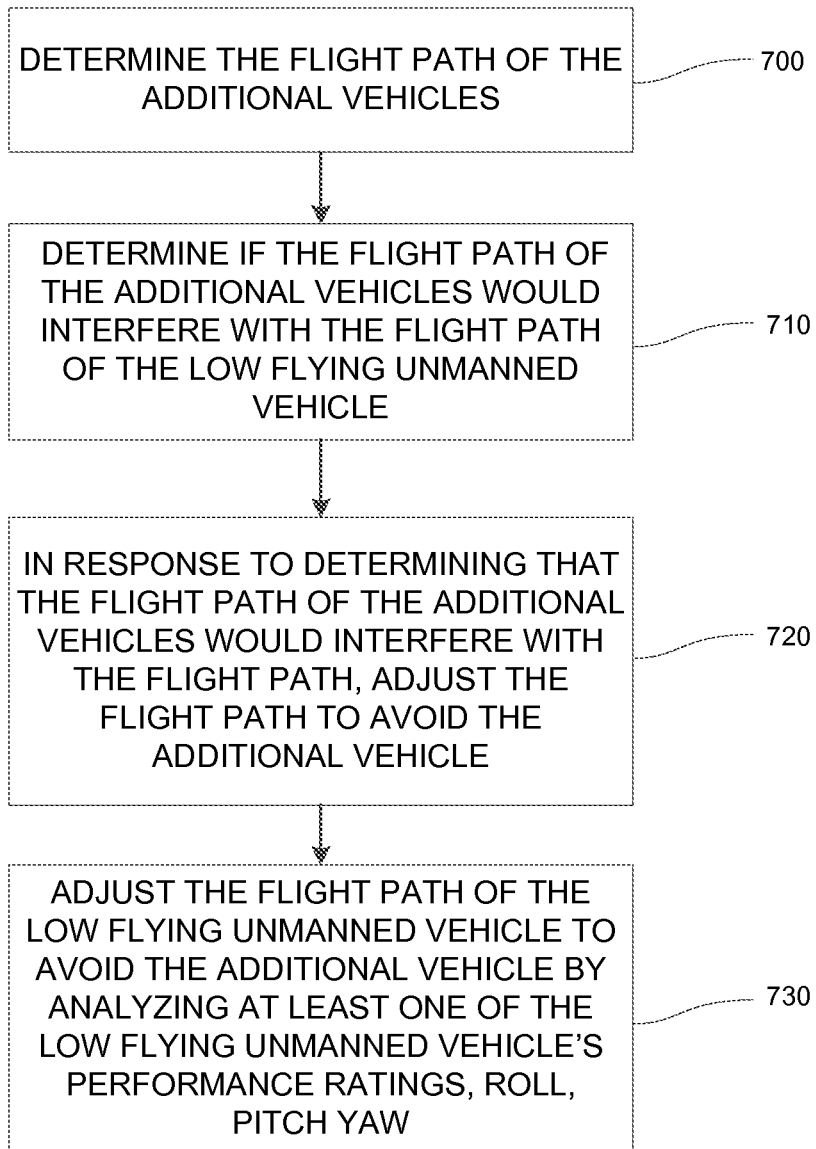
FIG. 7 may illustrate a method of adjusting operational data of the vehicle.

At block 640, flight operational data 250 may be adjusted on the vehicle 100 based on the relevant objects 110. FIG. 7 may illustrate a method of adjusting the operational data of the vehicle.

At block 700, the flight path 805 of the additional vehicles 110 may be determined. The flight path may be determined in a variety of ways. In one embodiment, the operational data 250 may be analyzed to determine the location of a first additional vehicle 110 at a plurality of times in the future. Similarly, the location of all the additional vehicles 110 at a plurality of times in the future may be determined. The locations may be analyzed to determine if the additional vehicles 110 may be within the radius 705 of the unmanned vehicle 100 at a point in the future.

In some embodiments, other vehicles 110 may not be broadcasting their operational data 250. The sensors 375 on the vehicle 100 may observe the other vehicle 110. The locations and flight operation data 250 may be determined for the other vehicles 110. For example, the distance travel over a period of time may be used to determine a speed of the additional vehicle 110. Similarly, the height of the additional vehicle 110 and the changes in direction may be observed and changes may be determined to create a flight path 805 for the observed additional vehicle 110 at points in time in the future assuming the flight path stays the same.

Below is a pseudo code example for using sensors 375 to observe the other vehicle 110. The vehicle 100 may perform an algorithm similar to the pseudo code provided above, but instead may use sensor data to determine a current latitude, longitude, speed, and track for one or more additional vehicles 110.

CheckUAVSensorArray
    getUAVSensorArray( )
    For each Object in getUAVSensorArray
    SendUAVSensorArrayo
    Data Input
    currentObject.Latitude=35.882234
    currentObject.Longitude=−78.788222
    currentObject.Altitude=30# meters
    currentObject.Speed=16# meters/sec
    currentObject.Track=93.6
    currentObject.ID=4923# Identifier assigned to vehicle 100
    AggressorObject.Latitude=35.866864
    AggressorObject.Longitude=−78.799637
    AggressorObject.Altitude=50# meters
    AggressorObject.Speed=18# meters/sec
    AggressorObject.Track=103.59
    AgressorObject.ID=13830# coded UAV ID
    uavFenceRadius.Critical=1437.38# meters
    uavFenceRadius.Warning=2046.72# meters
    Calculate_Distance (currentObject, uavFenceObject)
    constR=6371000.0# meters
    phi_1=radians(currentObject.Latitude)
    phi_2=radians(AggressorObject.Latitude)
    delta_phi=radians(AggressorObject.Latitude−currentObject.Latitude)
    delta_lambda=radians(AggressorObject.Longitude−currentObject.Longitude)

Similar to the example provided above, the vehicle 100 may use delta_phi and delta_lambda to determine a distance between itself and each additional vehicle 110 based on the curvature of the earth. The vehicle 100 may use the calculated distance to determine whether to issue a warning and/or to determine that a distance is critical potentially requiring vehicle 100 to initiate evasive maneuvers.

Check_Aggressor (ResultRange, uavFenceRadius)
    If ResultRange<uavFenceRadius.Critical
    safeLocation.Latitude=getSafeLocation.Latitude
    safeLocation.Longitude=getSafeLocation.Longtitude
    logOverrideEnabled( )
    notifyOverrideEnabled( )
    overrideToSafeLocation( )
    If ResultRange<uavFenceRadius.Warning
    logOverrideWarning( )
    notifyOverrideEnabled( )

In some embodiments, operational data 250 may include fixed object data on fixed objects like radio antennas, large buildings, tall buildings, trees, power lines, mountains, cliffs, waypoints, etc. The fixed object data may be known and may be communicated to the vehicle 100 from the central collection point 545. For example, small aircraft often use maps of known fixed objects to aid in navigation and these maps may be converted into digital data which may be useable by the vehicle 100. The communication may occur during set up for a flight based on an intended flight plan or may be communicated to the vehicle 100 in real time during the flight or traveling activity. In any of the embodiments, the fixed object data may be used to assist in not interfering with any fixed objects. Below is a pseudo code example of loading data on a geofence, which may correspond to a particular geographic location of a particular fixed object, for creating an intended flight plan to avoid fixed objects.

Receive GeoFence Table
    LoadGeoFence( )
    For each Object in LoadGeoFence
    Data Input
    currentObject.Latitude=35.882234
    currentObject.Longitude=−78.788222
    currentObject.Altitude=30# meters
    currentObject.Speed=16# meters/sec currentObject.Track=93.6
currentObject.ID=4923# Identifier assigned to vehicle 100
GeoFenceObject.Latitude=35.866864
GeoFenceObject.Longitude=−78.799637
GeoFenceObject.Height=20# meters
GeoFenceObject.ID=000483# coded Airport code or Other Object
geoFenceRadius.Critical=4437.38# meters
geoFenceRadius.Warning=5046.72# meters
Calculate_Distance (currentObject, GeoFenceObject)
constR=6371000.0# meters
phi_1=radians(currentObject.Latitude)
phi_2=radians(GeoFenceObject.Latitude)
delta_phi=radians(GeoFenceObject.Latitude−currentObject.Latitude)
delta_lambda=radians(GeoFenceObject.Longitude−currentObject.Longitude)

Similar to the examples provided above, the vehicle 100 may use delta_phi and delta_lambda to determine a distance between itself and each fixed object based on the curvature of the earth. The vehicle 100 may use the calculated distance to determine whether to issue a warning and/or to determine that a distance is critical potentially requiring vehicle 100 to initiate evasive maneuvers to avoid one or more objects.

Check_GeoFence (ResultRange, geoFenceRadius)
If ResultRange<geoFenceRadius.Critical
safeLocation.Latitude=getSafeLocation.Latitude
safeLocation.Longitude=getSafeLocation.Longtitude
logOverrideEnabled( )
notifyOverrideEnabled( )
overrideToSafeLocation( )
If ResultRange<geoFenceRadius.Warning
logOverrideWarning( )
notifyOverrideEnabled( )

In addition, the vehicle 100 may use sensors 375 to sense fixed objects, including in areas where fixed objects have not been determined previously. The data on the location, height and width of the fixed objects may be determined and may be communicated to the central collection point 545 where it may be added to the fixed object data. In addition, the collected fixed object data may be used to verify the fixed object data store at the central server 545. Below is a pseudo code example where sensors 375 sense fixed objects for collision avoidance.

CheckGeoSensorArray
getGeoSensorArray( )
For each Object in getGeoSensorArray
SendGeoSensorArray( )
Data Input
currentObject.Latitude=35.882234
currentObject.Longitude=−78.788222
currentObject.Altitude=30# meters
currentObject.Speed=16# meters/sec
currentObject.Track=93.6
currentObject.ID=4923# Identifier assigned to vehicle 100
GeoFenceObject.Latitude=35.866864
GeoFenceObject.Longitude=−78.799637
GeoFenceObject.Height=22# meters
GeoFenceObject.ID=000483# coded Airport code or Other Object
geoFenceRadius.Critical=1437.38# meters
geoFenceRadius.Warning=2046.72# meters
Calculate_Distance (currentObject, GeoFenceObject)
constR=6371000.0# meters
phi_1=radians(currentObject.Latitude)
phi_2=radians(GeoFenceObject.Latitude)
delta_phi=radians(GeoFenceObject.Latitude−currentObject.Latitude)
delta_lambda=radians(GeoFenceObject.Longitude−currentObject.Longitude)

Similar to the examples provided above, the vehicle 100 may use delta_phi and delta_lambda to determine a distance between itself and each sensed fixed object based on the curvature of the earth. The vehicle 100 may use the calculated distance to determine whether to issue a warning and/or to determine that a distance is critical potentially requiring vehicle 100 to initiate evasive maneuvers.

Check_Aggressor (ResultRange, geoFenceRadius)
If ResultRange<geoFenceRadius.Critical
safeLocation.Latitude=getSafeLocation.Latitude
safeLocation.Longitude=getSafeLocation.Longtitude
logOverrideEnabled( )
notifyOverrideEnabled( )
overrideToSafeLocation( )
If ResultRange<geoFenceRadius.Warning
logOverrideWarning( )
notifyOverrideEnabled( )

In yet some additional embodiments, weather conditions may also be communicated to the vehicle. In many operating environments, the weather may not be a significant factor but in other embodiments, the weather may affect the flight or travel of the vehicle 100. For example, a steady crosswind may affect a proposed course and the trim of a flying vehicle 100 may be adjusted in advance to account for the cross wind. Logically, the vehicle 100 may be able to adjust while in route but the adjustment may be less drastic if the weather is factored into operational data 250 in advance.

At block 710, it may be determined if the flight path of the additional vehicles 805 would interfere with the flight path 810 of the low flying unmanned vehicle 100. Logically, the location of the vehicles 110 at points in the future may be determined using the operation data 250 and it may be determined if the locations may be with a given radius 705.

At block 720, in response to determining that the flight path of the additional vehicles 805 would interfere with the flight path 810 of the low flying unmanned vehicle 100, the flight path 810 of the low flying unmanned vehicle 100 may be adjusted to avoid the additional vehicle 110. At block 730, the flight path 810 of the low flying unmanned vehicle 100 may be adjusted to avoid the additional vehicle 100 by analyzing at least one of the low flying unmanned vehicle's performance ratings, roll, pitch yaw. In addition, the determining may include analyzing at least one of the following of the additional vehicle's 110 classification, speed, altitude and climb/decent rate. Below is a pseudo code example for determining that a flight path may interfere and adjusting the flight path. Initially, the vehicle 100 may identify and calculate the distance to each nearby vehicle 110.

Receive Possible Aggressor Table
getNearObjects( )
For each Object in getNearObjects
SendNearObjectCalculated Path( )
Data Input
currentObject.Latitude=35.882234
currentObject.Longitude=−78.788222
currentObject.Altitude=30# meters
currentObject.Speed=16# meters/sec
currentObject.Track=93.6
currentObject.ID=4923# Identifier assigned to vehicle 100
AggressorObject.Latitude=35.866864
AggressorObject.Longitude=−78.799637

AggressorObject.Altitude=50# meters
AggressorObject.Speed=18# meters/sec
AggressorObject.Track=103.59
AgressorObject.ID=13830# coded UAV ID
localUAVPerformance=getUAVCaps(currentObject.ID)
AggressorCapabilities=getUAVCaps(AgressorObject.ID)

After determining the location of each additional vehicle 110, vehicle 100 may determine if its flight path may overlap at some future point in time with a flight path for any additional vehicle 110.

Calculate_Overlap (currentObject, AggressorObject)
localUAVPerformace=getUAVPerformance( )
localX=cos(currentObject.Latitude)*cos(currentObject.Longitude)
localY=sin(currentObject.Longitude)*cos(currentObject.Latitude)
localZ=sin(currentObject.Latitude)
AggressorX=cos(AggressorObject.Latitude)*cos(currentObject.Longitude)
AggressorY=sin(AggressorObject.Longitude)*cos(currentObject.Latitude)
AggressorZ=sin(AggressorObject.Latitude)
solveProjection:
intersectionObject=find Intersection Point(localX, localY, localZ, AggressorX, AggressorY, AggressorZ)
centerObject=projectazimuth(intersectionObject)
intersectionSolution=solveIntersection(centerObject, localXYZ, AggressorXYZ)
if (intersectionSolution>intersectionSolution+Threshold)
  GoTo solveProjection:
Else
  criticalPoint.Latitude=getLatitude(intersectionSolution.XYZ)
  critical Point.Longitude=getLongitude(intersectionSolution.XYZ)

To determine whether at some time the flight path of an additional vehicle 110 potentially would intersect with the vehicle's flight path—referred to as the "critical point"—the vehicle 100 may periodically (or continuously) calculate the distance between itself and the critical point.

Calculate_Distance (currentObject, criticalPoint)
constR=6371000.0# meters
phi_1=radians(currentObject.Latitude)
phi_2=radians(criticalPoint.Latitude)
delta_phi=radians(criticalPoint.Latitude−currentObject.Latitude)
delta_lambda=radians(critical Point.Longitude−currentObject.Longitude)

Similar to the examples provided above, the vehicle 100 may use delta_phi and delta_lambda to determine a distance between itself and the critical point based on the curvature of the earth. The vehicle 100 may use the calculated distance to determine whether to issue a warning and/or to determine that a distance is critical potentially requiring vehicle 100 to initiate evasive maneuvers. Below is example pseudo code for taking evasive maneuvers.

update_track (criticalPoint, localUAVPerformace, currentObject.Altitude, aggressorObject.Altitude, ResultRange)
  activateAvoidance(localUAVPerformance, ResultRange, currentObject.Altitude)
  escapeVector=optimizeFlightPath(criticalPoint)
  activateUpdatedTrack(escapeVector)

In some examples, the additional vehicle 110 may be a commercial airliner and the flight path 805 of the additional vehicle 110 may be received from a traditional airline flight path data tracking system. As is known, commercial aircraft broadcast their location to airline control systems. This data may be used to determine operational data 250 about the commercial flights.

In yet another embodiment, the vehicle 100 may use sensors 375 that sense for commercial aircraft using known flight data, and determine operational data 250 about the sensed aircraft. For example, apps exist for a portable computing device which may recognize commercial aircraft. The data may then be matched with known flight plans to determine the likely path of the commercial airliner. As an obvious example, the vehicle 100 may recognize a flight and determine if the flight is taking off (where it will likely rise) and if a flights is landing (where the flight will likely descend).

Referring again to FIG. 1, at block 130, the outbound data packet may be formatted to be wirelessly communicated, for example, over a mobile communication network 515 (FIG. 5). The formatting may take on a variety of forms and other communication networks may also be used (e.g., a satellite, WiFi, WiMax, etc. communication network). In one embodiment, the formatting 515 may include creating at least one selected from the group of a SMS message, a cellular transmission 525, a satellite data transfer or an ADS-b communication 535. The choice of communication form may relate to the height of the vehicle 100. For example, if the vehicle 100 is above 1500 feet (532), ADS-b may be used and if the vehicle is below 1500 feet, cellular technology may be used. In addition, the strength of the various communication forms may be analyzed and the strongest signal may be selected for communication.

At block 140, the outbound data packet may be wirelessly communicated (e.g., over the mobile communication network) to a collection site 545. The collection site 545 may include a communication device for receiving mobile communication.

The central collection point 545 may have a variety of forms. In one embodiment, the central collection point 545 may be a plurality of computing systems which communicate with each other. The central collection point 545 may accept communications that represent traditional airline flight paths and communicates unmanned flight data to the traditional airline flight path data tracking system.

At block 150, an inbound data packet may be received from the collection site. The inbound data packet may include data regarding relevant objects 110 determined to be over a threshold as explained previously. In some embodiments, receiving an inbound data packet from the collection site 545 may also require that the inbound data packet include data regarding relevant objects 110 where relevant objects 110 have been determined to be over a relevance threshold. As mentioned previously, the relevance threshold may include determining if the object 110 will be in range of the unmanned flying object 100 within a time threshold or a distance threshold. The collection site 545 may include a plurality of communication formats and the object 110 may be an immovable object or a moveable object.

At block 160, flight operational data 250 may be adjusted on the vehicle 100 based on the relevant objects 110. The method may take a variety of actions from changing direction, to changing height and to adjusting speed or a combination of any of the various adjustments. For example, the vehicle 100 may speed up and turn right to avoid an incoming additional object 110.

The device 100 may have a variety of hardware to implement the vehicle 100. Referring to FIG. 2, the vehicle 100 may have a GPS chip 215 which may collect location information which may be parsed by the CPU 160 for necessary information. As mentioned previously, the GPS data may be communicated in its raw format at times received from various satellites, may be converted into latitude and longitude or may be converted into yet another form that may be helpful in determining locations and flight paths.

The vehicle 100 may also have a cellular network processing chip 525 which may accept commands from the CPU 160 to send encrypted data over a cellular network to a ground based server 545 and may receive and read information sent to the cellular chip 525 from the central server 545 and send to the CPU 160 for parsing. The cellular network processing chip 525 may take the data to be communicated to and from the central point 545 and use an algorithm to allow the data to be communicated back and forth over the cellular network 525.

A central processing unit (CPU) 160 may perform a variety of computing functions. In one aspect, the CPU 160 may parse GPS information, may send encrypted messages to the cellular chip 525, may accept and parse incoming information from the cellular chip 525, and may communicate commands to any integrated autopilot system 225 or flight control servos. The CPU 160 may be purpose built to meet the challenged created by the vehicle 100. For example, the CPU 160 may need to be efficient as the vehicle 100 may be powered by a battery 235 which may have a limited amount of power. Similarly, the CPU 160 may be an off the shelf CPU 160 that is physically configured to computer executable instructions and is sufficiently efficient.

The vehicle 100 may also have connectivity ports (not shown) which may allow for a connection to other systems such as ADS-b Transmitter/Receiver Module 535 which may operate in the 1033 MHz band. It should be noted that ADS-b coverage may only exist at 1500+ feet above ground level. The modular additions may provide a means or manner to connect to different autopilot systems to send maneuver commands for detect and avoid needs in the case of possible collision. For example, the device may operate using GPS coordinates and a second device may operate using height and direction vectors and an additional modular addition may be used to translate flight operations of the first device into direction vectors which may be used by the second device. The ports may be standard ports such as USB ports or may be purpose built ports. In addition, the CPU 160 may have instructions on what to do if an additional computing device is inserted into the ports such as how to communicate with the device, how to determine if the device is safe, which device has precedence, etc.

The vehicle 100 may also have a battery 235 and/or external power connections. The battery may allow the system to be powered by a UAV independent battery or allow for connection directly into the UAV flight power system. In some embodiments, the battery 235 may be used to provide additional power to the UAV if the UAV loses or runs low on power. In some embodiments, the battery 235 supplies 5-24 volts but the vehicle 100 may operate with a variety of voltages and current ratings.

The vehicle 100 may also have roll, pitch, yaw, and accelerometer sensors 375. The sensors 375 may provide IMU data to assist in evasive maneuver planning calculations. The current location of the device is only part of the data needed to determine if a flight collision may occur as the vehicle 100 may change course. The roll, pitch, yaw and accelerometers sensors 375 may assist in determining a future course for the vehicle 100 and whether a collision is likely. Below is a pseudo code example for determining evasive maneuver planning calculations. Initially, the vehicle 100 may use sensors to identify each nearby vehicle 110 and then calculate the distance to each sensed nearby vehicle 110.

```
CheckUAVSensorArray
getNearObjects ( )
localUAVSensor=getUAVSensorArray( )
For each Object in getUAVSensorArray
SendUAVSensorArrayo
SendNearObjectCalculated Path( )
Data Input
currentObject.Latitude=35.882234
currentObject.Longitude=−78.788222
currentObject.Altitude=30# meters
currentObject.Speed=16# meters/sec
currentObject.Track=93.6
currentObject.ID=4923# identifier of vehicle 100
AggressorObject.Latitude=35.866864
AggressorObject.Longitude=−78.799637
AggressorObject.Altitude=50# meters
AggressorObject.Speed=18# meters/sec
AggressorObject.Track=103.59
AgressorObject.ID=13830# coded UAV ID
uavFenceRadius.Critical=1437.38# meters
uavFenceRadius.Warning=2046.72# meters
```

After determining the location of each additional vehicle 110, vehicle 100 may determine if its flight path may overlap at some future point in time with that of any additional vehicle 110.

```
Calculate_Overlap (currentObject, AggressorObject)
   localUAVPerformace=getUAVPerformance( )
   localX=cos(currentObject.Latitude)*cos(currentObject.Longitude)
   localY=sin(currentObject.Longitude)*cos(currentObject.Latitude)
   localZ=sin(currentObject.Latitude)
   AggressorX=cos(AggressorObject.Latitude)*cos(currentObject.Longitude)
   AggressorY=sin(AggressorObject.Longitude)*cos(currentObject.Latitude)
   AggressorZ=sin(AggressorObject.Latitude)
   solveProjection:
   intersectionObject=find Intersection Point(localX, localY, localZ, AggressorX, AggressorY, AggressorZ)
   centerObject=projectazimuth(intersectionObject)
   intersectionSolution=solveIntersection(centerObject, localXYZ, AggressorXYZ)
   if (intersectionSolution>intersectionSolution+Threshold)
   GoTo solveProjection:
   Else
   criticalPoint.Latitude=getLatitude(intersectionSolution.XYZ)
   critical Point.Longitude=getLongitude(intersectionSolution.XYZ)
```

To determine whether at some time the flight path of an additional vehicle 110 potentially may intersect with the vehicle's flight path—referred to as the "critical point"—the vehicle 100 may calculate the distance between itself and the critical point.

```
Calculate_Distance (currentObject, criticalPoint)
   constR=6371000.0# meters
   phi_1=radians(currentObject.Latitude)
   phi_2=radians(criticalPoint.Latitude)
   delta_phi=radians(criticalPoint.Latitude−currentObject.Latitude)
   delta_lambda=radians(critical Point.Longitude−currentObject.Longitude)
```

Similar to the examples provided above, the vehicle 100 may use delta_phi and delta_lambda to determine a distance between itself and the critical point based on the curvature of the earth. The vehicle 100 may use the calculated distance to determine whether to issue a warning and/or initiate evasive maneuvers. Below is example pseudo code for initiating evasive maneuvers.

update_track (criticalPoint, localUAVPerformace, currentObject.Altitude, aggressorObject.Altitude, localUAVSensor, ResultRange)
        activateAvoidance(localUAVPerformance, localUAVSensor, ResultRange, currentObject.Altitude)
        escapeVector=optimizeFlightPath(criticalPoint)
        activateUpdatedTrack(escapeVector)

The vehicle 100 may also have a localized wireless module 180. The localized wireless module 180 may allow for connection and configuration via a secondary handheld device such as a portable computing device (cellular phone) where one may access additional feature of the vehicle 100. The flight data may be loaded into or received from the vehicle 100 in a variety of ways and the wireless module 180 may allow additional computing devices to wirelessly communicate with the device.

The following may be an example of the device 100 in operation. A low flying unmanned vehicle 100 may be flying over a farm field. An airliner 100 may also be nearby, preparing to land. The vehicle 100 may have an infrared camera to determine the water content of the crops in the field. On a periodic basis, the vehicle 100 may report its operational data 250 to a nearby cellular tower. The data may be encapsulated as an SMS message or in any other appropriate format or form such as cellular, satellite, WiFi, WiMax, etc., and may be directed to a central collection site 545.

The central collection site 545 may receive and analyze the operational data 250 from the vehicles and aircraft which may be stored in a database or server 172. The analysis may quickly parse the vehicles into geographic areas. As mentioned previously, the vehicle 100 may determine if any of the additional vehicles 110 will be in a radius around each other in a relevant range or radius 705 and the flights that are determined to be over a threshold or nearby may be stored as separate flights 174.

The vehicle 100 may receive messages 525 from the cellular tower which also may be encapsulated as SMS messages or in any other appropriate format or form such as cellular, satellite, WiFi, WiMax, etc. The messages may contain operational data 250 from a second low flying unmanned vehicle 110 working on an adjacent field. In addition, the vehicle 100 may use GPS 215 to determine its current location which along with relevant location and flight parameters 176. The operational data 250 and operational data for the additional vehicle 110 may communicated to the CPU 160 where an algorithm 182 may have physically configured the CPU to determine the flight path of the vehicle 100 and the flight path of other relevant vehicles 110 and whether the paths may intersect. The algorithm may take into account the current position and projected path at points in time in the future for vehicles 100, 110 to determine if a collision may occur. If the algorithm 182 determines a collision is likely, evasive maneuver commands 184 may be created and made be communicated to the vehicle 100. If the vehicle 100 has auto pilot 225, the maneuver commands 184 may communicated to the autopilot system 225 on the vehicle 100 where it may be interpreted and communicated to the flight control servos 227 module which may execute the maneuver. If the vehicle 100 does not have autopilot 225, the command may be communicated directly to the flight control servos 227.

Figure 9A:
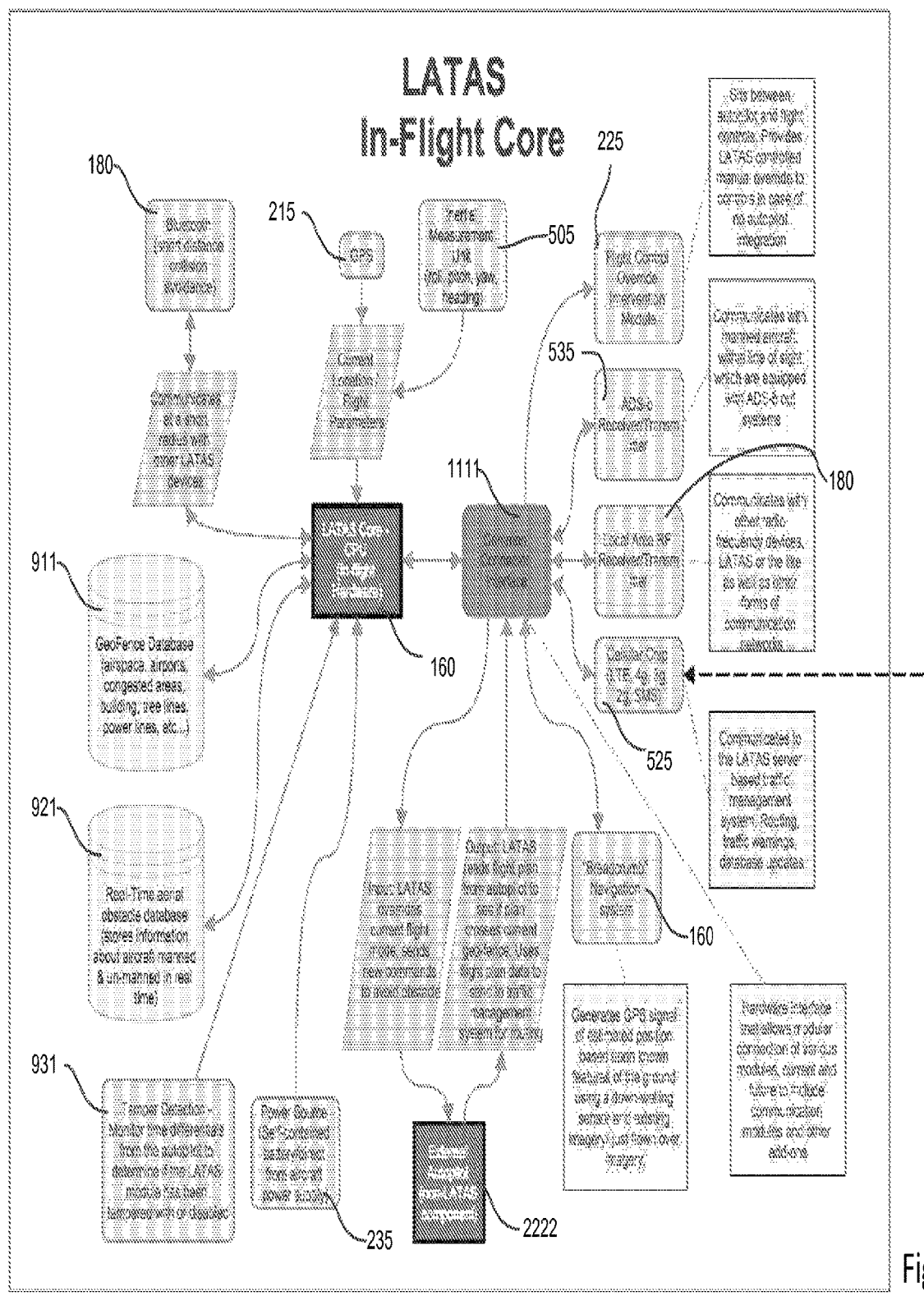
FIG. 9a may illustrate several aspects of a system.

FIG. 9a may illustrate another embodiment of the system. In this embodiment, the processor 160 may receive additional information. In one aspect, a database with geofence data 931 may also be in communication with the processor 160. Geofence data may include data about location which the vehicle 100 should avoid such as restricted airspace, airport, congested area, buildings, tree lines, power lines, etc. Geofence data may be known and may be created in advance of a flight.

In some embodiments, the geofence data may be targeted to the general area of the vehicle. For example, data on geofences in China may not be relevant to a vehicle that is operating in the United States. Different modules of geofence data may be available and loaded depending on the location of the vehicle. In this arrangement, less data with have to be sifted to obtain the information that is most relevant.

The geofence data may come from a variety of sources. As an example, the US government may publish a data on restricted regions. In addition, the position of buildings which would interfere with vehicular travel may be obtained from a mapping data source. The data may be aggregated into a single file for rapid access and ease of understanding.

In some embodiments, the geofence data may also include a "whitelist" or data about locations that are not subject to a geofence. The whitelist data may be a useful double check to ensure that a vehicle is clear to travel. Further, the data may be reviewed in advance of a session to ensure a vehicle is safe to travel.

Real time obstacle data may also be stored and used such that the obstacle data may be immediately shared with others. For example, if a hot air balloon is unexpectedly preparing to land, the data on the location, direction and path of the balloon may be stored in the real time obstacle database 921. The data on the obstacles also may be shared through communication links to a central authority that may add the real time obstacle data to its database and it may communicate the obstacle data to other nearby vehicles. Thus, other vehicles in the area may be promptly informed of the obstacle.

A tamper detection module 931 may also be part of the system. The tamper detection module 931 may operate in a variety of ways. In one embodiment, the module may monitor time differentials from the autopilot to determine if someone unauthorized has tampered with the processor 160. For example, if the time differentials are not as expected, the assumption may be made that someone has tampered with the processor 160. In yet another embodiment, the processor may be cemented in place in the circuit board may break if an attempt is made to modify or remove the processor 160. Similarly, the processor may periodically self-check itself to ensure it is operating as expected and if the self-check fails, the vehicle may render itself inoperable until the unexpected conditions are fixed. Common self-checks including comparing the current surroundings to surrounds that should be expected based on the GPS signals and previous images from the GPS coordinates, checking battery life in comparison to an expected flight length, etc.

At block 2222, an external autopilot may also be used to assist the vehicle. In the situation where the processor 160 determines that the current travel plan needs to be changed to avoid an obstacle, for example, the new travel plan may be communicated to an external autopilot 2222. The new travel plan may override the current travel mode. The external autopilot 2222 may submit a new travel plan which the processor 160 may review to ensure the vehicle does not cross any geofences, cross into the flight path of any other known vehicles, does not hit any buildings, etc. The external autopilot may be able to direct the vehicle from hitting a first obstacle, but the processor may be knowledge of even more obstacles than the outside autopilot. Thus the new flight plan may be reviewed by the processor 160. In addition, the new flight plan may be communicated to traffic management for routing other vehicles and letting other vehicles know of the intended travel plan.

Below is a pseudo code example for determining whether to change a flight path to avoid an obstacle. In an example, the vehicle 100 may periodically or continuously identify and calculate the distance to each nearby additional vehicle and/or obstacle.

```
Receive Possible Aggressor Table
getNearObjects( )
LoadGeoFence( )
For each Object in getNearObjects
SendNearObjectCalculated Path( )
Data Input
currentObject.Latitude=35.882234
currentObject.Longitude=-78.788222
currentObject.Altitude=30# meters
currentObject.Speed=16# meters/sec
currentObject.Track=93.6
currentObject.ID=4923# identifier of vehicle 100
AggressorObject.Latitude=35.866864
AgressorObject.Longitude=-78.799637
AggressorObject.Altitude=50# meters
AggressorObject.Speed=18# meters/sec
AggressorObject.Track=103.59
AggressorObject.ID=13830# coded UAV ID
GeoFenceObject.Latitude=35.866864
GeoFenceObject.Longitude=-78.799637
GeoFenceObject.Height=22# meters
GeoFenceObject.ID=000483# coded Airport code or Other Object
geoFenceRadius.Critical=1437.38# meters
geoFenceRadius.Warning=2046.72# meters
localUAVPerformance=getUAVCaps(currentObject.ID)
AggressorCapabilities=getUAVCaps(AgressorObject.ID)
```

After determining the location of each nearby additional vehicle and/or obstacle, vehicle 100 may determine if its flight path may overlap at some future point in time with either.

```
Calculate_Overlap (currentObject, AggressorObject)
localUAVPerformace=getUAVPerformance( )
localX=cos(currentObject.Latitude)*cos(currentObject.Longitude)
localY=sin(currentObject.Longitude)*cos(currentObject.Latitude)
localZ=sin(currentObject.Latitude)
AggressorX=cos(AggressorObject.Latitude)*cos(currentObject.Longitude)
AggressorY=sin(AgressorObject.Longitude)*cos(currentObject.Latitude)
AggressorZ=sin(AggressorObject.Latitude)
solveProjection:
intersectionObject=find Intersection Point(localX, localY, localZ, AggressorX, AggressorY, AggressorZ)
centerObject=projectazimuth(intersectionObject)
intersectionSolution=solveIntersection(centerObject, localXYZ, AggressorXYZ)
if (intersectionSolution>intersectionSolution+Threshold)
GoTo solveProjection:
Else
criticalPoint.Latitude=getLatitude(intersectionSolution.XYZ)
critical Point.Longitude=getLongitude(intersectionSolution.XYZ)
```

To determine whether at some time the flight path of an additional vehicle and/or obstacle potentially may intersect with the vehicle's flight path—referred to as the "critical point"—the vehicle 100 may periodically (or continuously) calculate the distance between itself and the critical point. In some instances, there may be multiple critical points (e.g., one for a fixed object, one for an additional vehicle, and another for a geofence).

```
Calculate_Distance (currentObject, criticalPoint)
constR=6371000.0# meters
phi_1=radians(currentObject.Latitude)
phi_2=radians(criticalPoint.Latitude)
delta_phi=radians(criticalPoint.Latitude-currentObject.Latitude)
delta_lambda=radians(critical Point.Longitude-currentObject.Longitude)
Calculate_Distance (currentObject, GeoFenceObject)
constR=6371000.0# meters
phi_1=radians(currentObject.Latitude)
phi_2=radians(GeoFenceObject.Latitude)
delta_phi=radians(GeoFenceObject.Latitude-currentObject.Latitude)
delta_lambda=radians(GeoFenceObject.Longitude-currentObject.Longitude)
```

Similar to the examples provided above, the vehicle 100 may use delta_phi and delta_lambda to determine a distance between itself and each critical point based on the curvature of the earth. The vehicle 100 may use the calculated distance to determine whether to issue a warning and/or initiate evasive maneuvers. Below is example pseudo code for initiating evasive maneuvers.

```
update_track (criticalPoint, localUAVPerformace, currentObject.Altitude, aggressorObject.Altitude, ResultRange, GeoFenceResultRange)
activateAvoidance(localUAVPerformance, ResultRange, currentObject.Altitude)
escapeVector=optimizeFlightPath(criticalPoint)
flightPlan=updateFlightPlan(escapeVector, GeoFenceObject, ResultRange, GeoFence ResultRange)
activateUpdatedTrack(escapeVector, flightPlan)
```

A Common Connector

A "breadcrumb" system may also be used to ensure a vehicle 100 will be able to find its way even if traditional GPS systems stop working. The breadcrumb systems may have a plurality of aspects and may work in a variety of ways, some of which may complement each other.

In one aspect, the vehicle may take images while following a flight plan. If a GPS signal is lost, a vehicle may recall these images (e.g., from memory or other data storage device), compare the current image to the known images from the initial flight path and change its flight path toward the objects which are recognized. In addition, if no objects are recognized, the vehicle may travel in ever increasing circles until it traverses terrain that is recognized. Below is example pseudo code of this process. In the below example, the vehicle 100 may capture images while flying and assign GPS coordinates to each image, prior to failure of a GPS system. The captured images may be stored for later comparison should the GPS system stop working. When using the breadcrumb system, the vehicle 100 may compare captured images to stored images looking for matches. The vehicle 100 may also assign confidence scores based on the degree of matching. Matches may be used to guide the vehicle in the absence of GPS data.

Finger Print Current Fly Over Image
        localUAVSensor=getUAVSensorArray( ) #9 Axis Accelerometer
        dead-reckoning=getPositionOffset(localUAVSensor)
        imageMatchThreshold=489# configurable
        location Images=getLocationImages(lastGPS.Latitude+dead-reckoning, lastGPS.Longitude+dead-reckoning, gps.Altitude+dead-reckoning)
        # Land image fingerprints are small in size compared to actual images. Images are stored in local memory and may be updated
        currentImage=captureImage( )
        imagePrint=fingerprintImage(currentImage)
        For each searchimage in locationimages
        Data Input
        If (imageMatch (locationImages.fingerprint, imagePrint.fingerprintd)>485)
            proposedLocation=newLocation( )
            assignedConfidence=newConfidence(previousConfidence)
            Continue to New Track Pathway In another aspect, the vehicle may review images related to the current location of the vehicle. If there are existing images from past flights, the existing images may include additional such as GPS data related to the images. Thus, the vehicle may traverse and take images and if the new images match past images, the GPS coordinated from the past image may be used to indicate the current GPS location. Further, the vehicle may have noted its GPS position at the beginning of its flight. By collecting addition GPS data from additional known sites with stored GPS locations, the vehicle may be able to triangulate its position and determine a path to its starting point or another stored rendezvous location.

In another aspect, the vehicle 100 may simply attempt to reverse its current path. In some conditions such as when it is windy, the ability to retrace a path may be especially difficult but images from the initial flight path may be used to guide the vehicle back toward its starting point. Below is example pseudo code applied by vehicle 100 to reverse its path using images.

Finger Print Current Fly Over Image
        reverseWaypoint=getWaypoint(atIndex)
        localUAVSensor=getUAVSensorArray( ) #9 Axis Accelerometer
        dead-reckoning=getPositionOffset(localUAVSensor)
        imageMatchThreshold=489# configurable
        location Images=getLocationImages(lastGPS.Latitude+dead-reckoning, lastGPS.Longitude+dead-reckoning, gps.Altitude+dead-reckoning)
        # Land image fingerprints are small in size compared to actual images. Images are stored in local memory and may be updated
        currentImage=captureImage( )
        imagePrint=fingerprintImage(currentImage)
        For each searchimage in locationimages
        Data Input
        If (imageMatch (locationImages.fingerprint, imagePrint.fingerprintd)>485)
            proposedLocation=newLocation(reverseWaypoint)
            assignedConfidence=newConfidence(previousConfidence)
            Continue to New Track Pathway
        activateUpdatedTrack(proposedLocation, flightPlan)

In another aspect, the vehicle 100 may make note of its starting point in a variety of ways and these starting point notations may be used to guide the vehicle back to its starting location or another desired location. In one embodiment, the vehicle may receive and store cell phone tower information such as the tower identifier, a timing signal and the signal strength of the various cell towers. The location of the cell towers may be fixed. From analyzing the cell tower signal strength or timing signals, triangulation may be used to determine a starting location. Assuming the cell tower and vehicle both have access to an accurate and consistent time reference, timing signals may be a very accurate indication of when a signal was sent. The vehicle may receive the signal at a later time and the difference between the send time and the received time may be used to determine the distance from the cell tower as the velocity of the cell tower signal may be known. Triangulation may be used to determine the location of the vehicle in relation to the various cell towers. In addition, the GPS location of the cell towers may be known and the GPS location of the vehicle may be determined using the GPS coordinates of the cell towers and the timing signals.

Similarly, the timing signals from cellular towers may be used to determine a location of the vehicle if a GPS signal is lost in flight. Using timing and known cell tower locations, triangulation may be used to determine a location of the vehicle. Further, the cell tower signals may be used to guide the vehicle back to a start point or to an additional location.

Signal strength from various cell towers may be known and the received signal strength from a plurality of cell towers may be used to determine the location of the vehicle. Similar to timing signals, the signal strength may be known at given locations and may be used to determine a location of a vehicle by comparing the observed signal strength to previously mapped signal strength measurements.

Other broadly available signals may be used to triangulate a location if GPS signals fail. In some situations, traditional radio signals such as AM and FM may have known signal strengths in known locations. At a minimum, the signal strengths may be used to narrow down the list of possible locations and at best, triangulation may be possible from a variety of signals from a variety of towers to establish either a starting location or a current location. Signals from non-GPS satellites such as television satellites or wireless phone satellites, known WiFi signals also may be received and used to triangulate locations.

Finally, traditional method of observing sun, moon and stars and the time of day may be used. As the location of the sun, moon, and certain star may be known at given times, locations may be determined. The locations may not be as accurate as GPS signals but may provide useful guidance.

Of course, elements of these various aspects may be combined to create a more accurate location. For example, if two cell phone towers signals may be received and a single FM signal, three signals may be combined to attempt to triangulate a location. Further, the additional various signals may be used to verify a location in situations where a GPS signal may be in doubt.

In some embodiments, a homing signal may be communicated from a device at a point of origin or at another desired location. The signal may be a low power, low frequency signal that may be heard from great distances. The vehicle may execute a travel pattern such as a series of circles or squares which may be used to determine a general travel path and as the vehicle moves closer to the source of the signal, the path may be further improved to maximize the received signal which would indicate the beacon is near.

In some embodiments, the vehicle may contain the homing signal. The homing signal may be used if there is a major failure and the launching vehicle may need to locate the vehicle. For example, if GPS is lost, the vehicle may travel in a limited space that has been determined to be safe and may operate the homing signal. If power drops to a predetermined level, the vehicle may take steps to determine a safe landing location and may continue to communicate the homing signal.

Of additional interest, the vehicle may be equipped with a flight control override intervention module 225. The module may sit between the autopilot and flight controls and may provide the processor 160 controlled manual override to the controls in case of no autopilot integration. As a result, an authority such as the FAA may have the ability to override a vehicle travel plan. The override may be for any purpose such as to avoid a collision or to free the area for an authority vehicle such as a police vehicle.

Figure 9B:
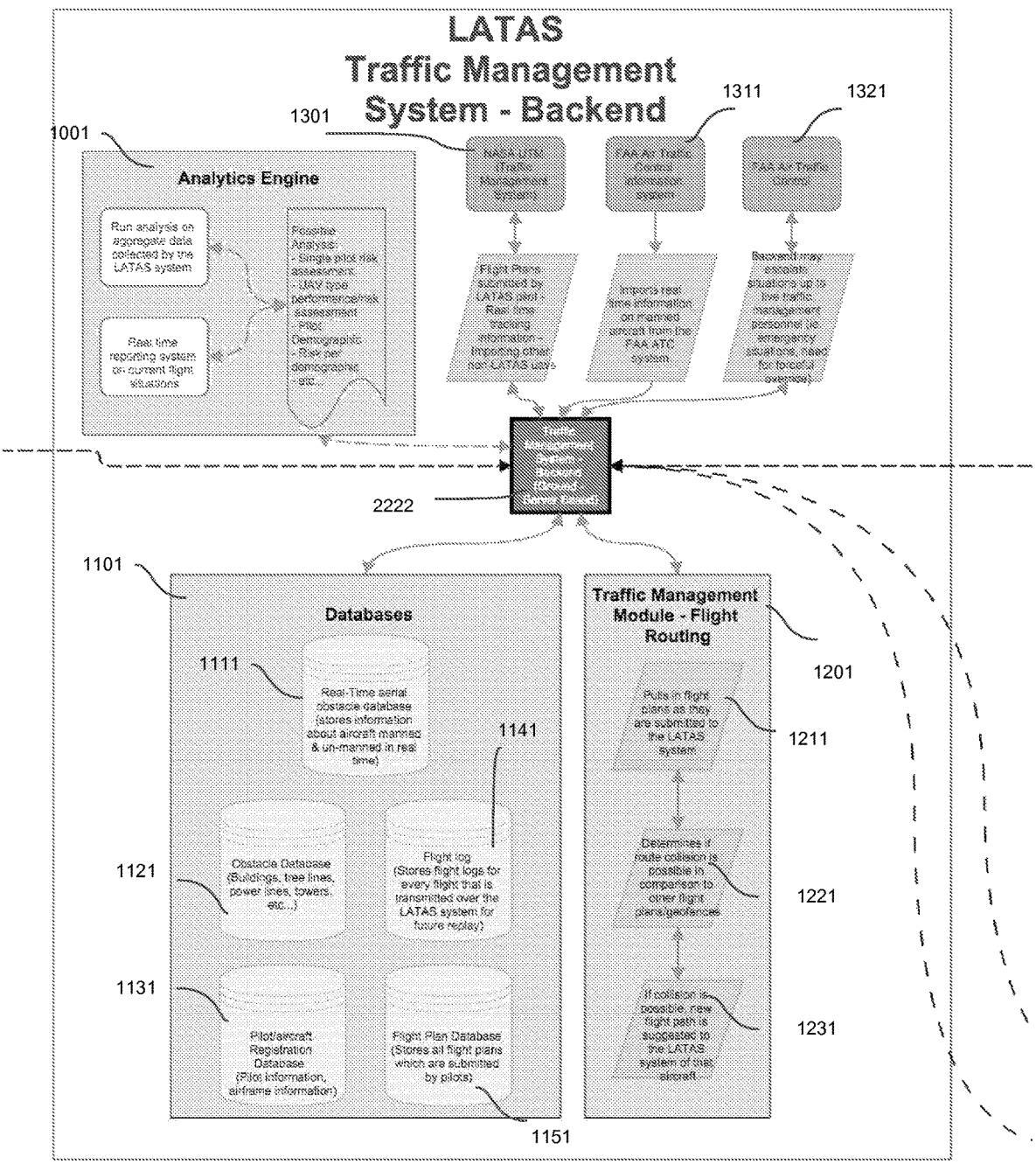
FIG. 9b may illustrate a backend of the system.

FIG. 9b may illustrate a backend 2222 of a traffic management system. At a high level, numerous systems may feed data to the traffic management system backend 2222 including an analytics engine 1001, databases 1101, traffic management modules 1201 and various FAA data sources 1301, 1311, 1321.

The analytics engine may review data collected on vehicles operations and operators and may attempt to come to some useful conclusions. The data from all vehicles that use the system and method may be collected. In addition, real time data on current systems may be collected. From this collection of data, algorithms may attempt to review and quantify risk. For example, the data may determine that pilot A is prone to errors while pilot B is extremely careful and has little risk. The data may even show that certain pilot demographics are more risky than others. For example, an algorithm may study the flight data and determine that pilots under the age of 25 may be riskier than pilots aged 34-43. Similarly, it may be determined that certain vehicles are riskier than others. Logically, there may be a variety of conclusions that may be drawn from the data and may be used as part of the system. As an example, if a risky pilot is flying a risky vehicle, a warning may be issued that the risk of this flight is over a predetermined threshold which may be a user threshold, a calculated threshold or a default threshold. Below is pseudo code for determining whether to issue a warning.

Device Side: Update Analytics Engine Service
sendGeoSensorArray(geoSearchData)
sendImageFingerprint(imageFingerprintData)
sendAudioGeoSensorData(audioData)
sendRFSpectrumData(RFAnalysisData)
sendNearObjectData(gpsData, Range, AgressorObject)
Cloud Side: Aggregate Data Service
updateGeoFenceData(geoSearchData)
updateImageArchive(imageFingerprintData)
updateAudioData(audioData)
updateRFData(RFAnalysisData)
updateNearObjectData(gpsData, Range, AggressorObject)

Databases 1101 also may feed data to the traffic management system 2222. A first database 1111 may store real time data on aerial obstacles in the relevant area such as other vehicles. A second database may store data on obstacles 1121 such as building, power lines, windmills, silos, trees, etc. A third database 1131 may include pilot/aircraft registration data which may include information on pilots and planes which may be used to assess risk. A flight log database 1141 may be used to store flight logs on past flights such that the flights may be replayed in the future. A flight plan database 1151 may store all flight plans that are submitted by pilots which may be accessed and used to create additional flight paths in the future.

A traffic management module 1201 may be used to determine flight routing data to be communicated to the traffic management system backend 2222. The routing may pull in plans as they are submitted 1211 to the processor 160, may determine if a route collision is possible in comparison to other flight plans and geofences. At block 1231, the system may determine if a collision is possible, and then a new flight path may be suggested to the processor 160 of the vehicle.

Other agencies related to tracking vehicles may also submit useful data. NASA 1301 may submit flight plans which may need to be submitted to the traffic management system 2222. Similarly, FAA air traffic control 1311 may import and report real time information on manned aircraft from the FAA ATC system. The FAA Air Traffic Control may escalate situations up to live traffic management personnel such as emergency or other situations that might require a manual override.

Figure 9C:
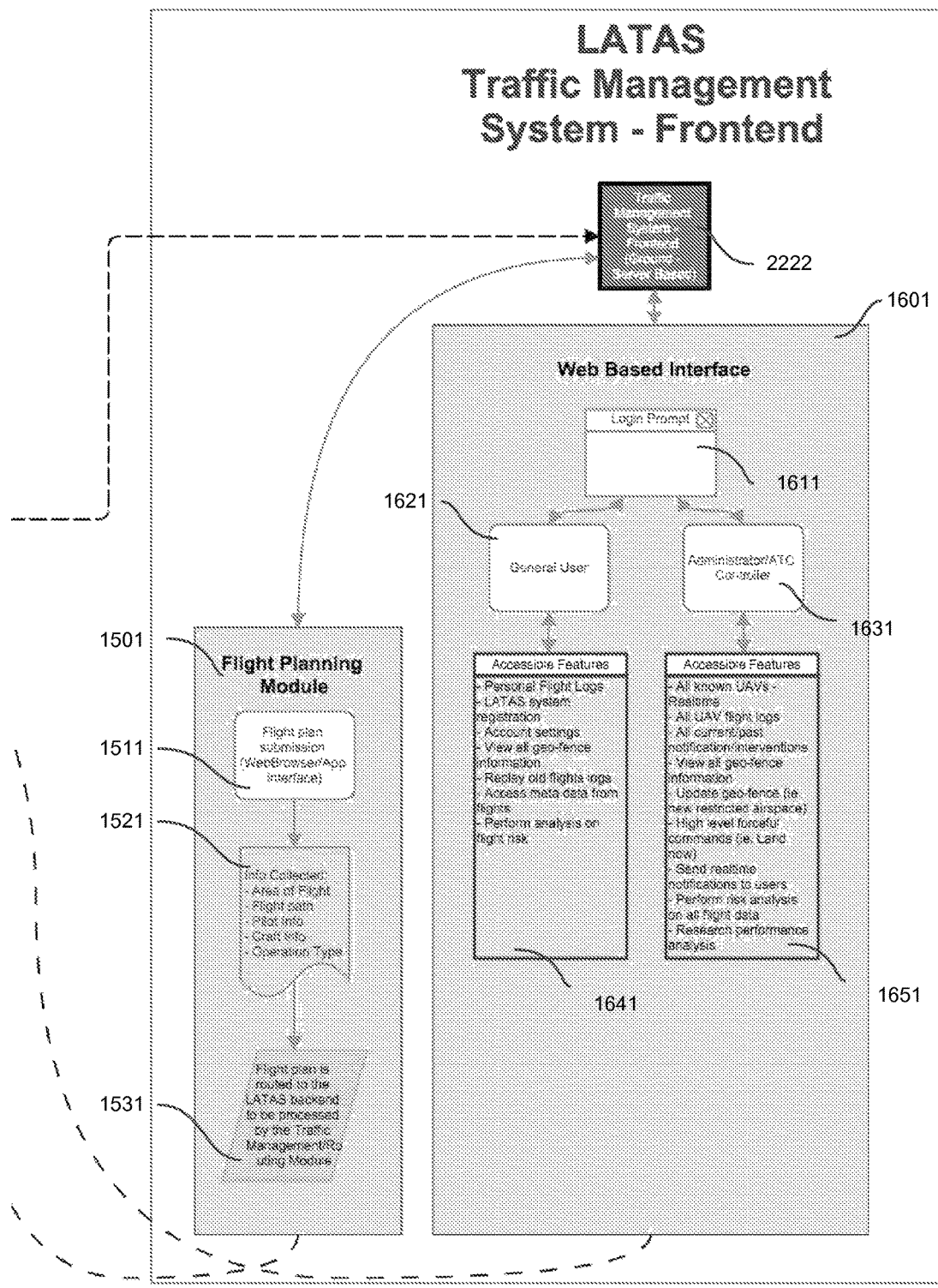
FIG. 9c may illustrate elements of a user interface to the system.

FIG. 9c may illustrate a user interface that interfaces with the traffic management system 2222. A flight planning module 1501 may make it easy for pilots of vehicles to submit flight plan 1511 through a variety of interfaces such as a web browser interface. A variety of information may be collected 1521 such as a general area of the vehicle, the proposed vehicle path, the pilot information, the craft information and the operation type.

An interface may also allow easy access to review all the data on vehicle and vehicle travel plans. Logically, the data may be restricted and a login may be required 1611. The login may be a traditional login or may be a secure electronic key exchange or may require biometric verification of the proposed users. It may be web or cloud based or may be a purpose built computer.

A general user 1621 may be presented with a user interface tailored to that individual. Accessible features to a general user 1621 may include personal flight logs, registration data for the local system, account settings, geo-fence information, option to see old flight logs, see meta data regarding flights, and performing algorithms to analyze the risk of a flight.

An administrator 1631 may be able to see more data 1651. For example, the administrator may see all known vehicles in real time, all vehicle travel logs, all current or past notifications or interventions, all geofence information, the option to update geofence data, the option to force a vehicle to undertake an action, communicate real-time notifications to user, perform risk analysis on flight data and research performance analysis. The data may be in an easy to see graphical interface which may facilitate understanding by displaying the complicated data in an easy to understand and access format. Below is example pseudo code for sending sense and avoid data to vehicle 100.

Figure 10:
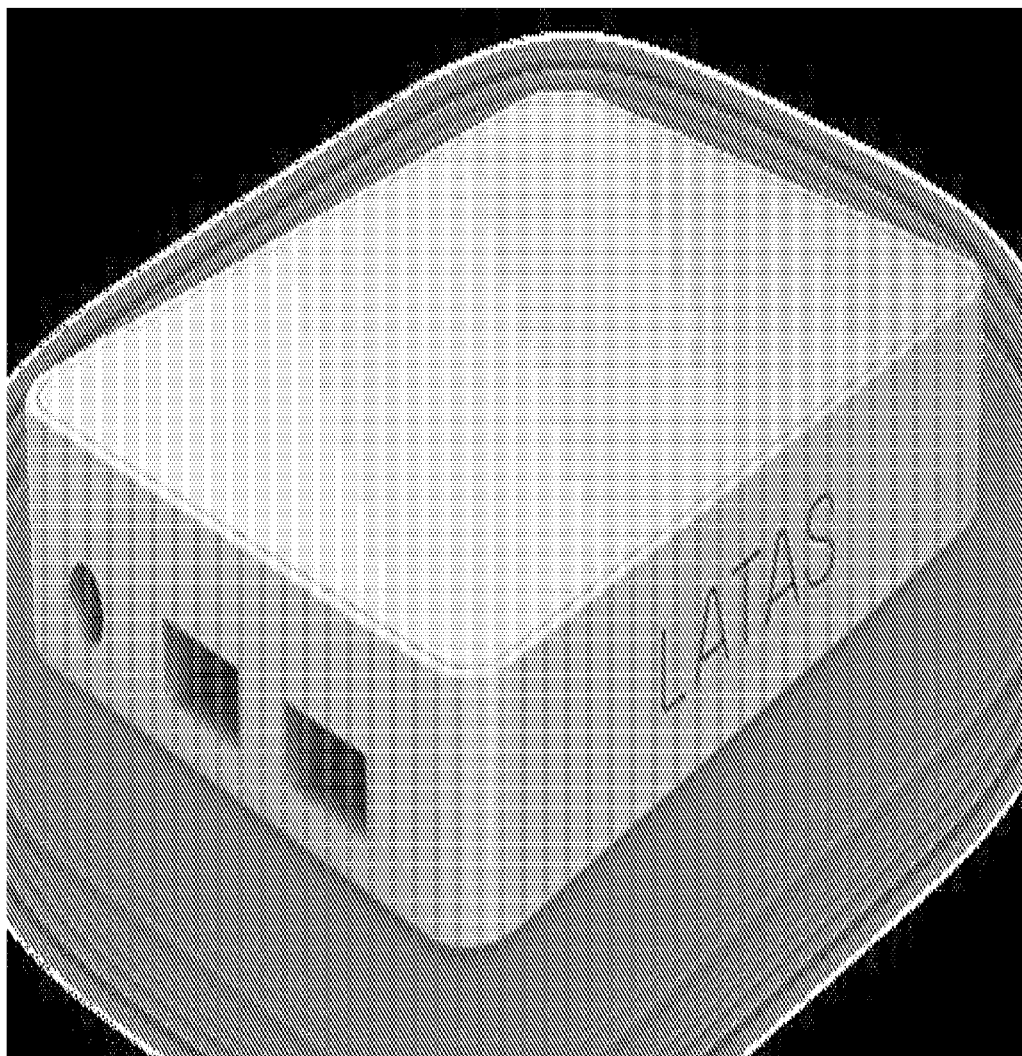
FIG. 10 may illustrate a device with a processor.

Receive RealTime Sense and Avoid Data from UAV
calculatePriority=processIncomingSenseData(currentObject)
targetConfirmedNew=confirmNewTarget( )
addNewTarget(targetConfirmedNew)
For each UAVRequest from currentObject
sendRealTimeData( ) # send current live sense and avoid data to UAV The processor 160 may be integral to a vehicle 100 such as being on a circuit board that is a structural member. In other embodiments, the processor 160 is a separate device which may be used to control virtually any vehicle via a standard protocol and interface, such as an Ethernet jack, Bluetooth, WiFi or fiber communication link. The processor 160 also may be light weight and compact and may be designed to extend external power. For example, processor sections which are not is use may be turned off when not needed. As an example, a sound function may be useful during programming a flight path but may not be useful during flight. FIG. 10 may be an illustration of a sample device.

The processor 160 may be placed on or integrated into existing small vehicles such as UAV platforms. The processor 160 or chip may stand-alone, providing a framework which will allow real-time tracking of small vehicles at altitudes between 0-1000 ft above ground level. The core framework may be expandable and modular to interface with numerous communication protocols. The standard form of communication may be achieved over cellular networks even at their lowest bandwidth, however, the communication may be expanded to run on other networks such as wide-area WIFI and ADS-b. The system hardware may be incorporated onto vehicles by three methods.

The hardware may be purchased stand-alone as a device which mounts onto any airframe without any autopilot integration, providing real time tracking information only. The second method is a stand-alone unit which may plug into a number of pre-integrated autopilots (3dr, APM, DJI, etc.). Providing real time tracking coupled with autopilot override functionality enabling sense-and-avoid capability. The third integration solution may be provided by licensing build schematics of the hardware to vehicle manufacturers, allowing them to incorporate the system directly onto their integrated circuits. The firmware may be strictly maintained by a single source, with updates provided over the cellular network infrastructure.

In another aspect, the vehicle 100 may attempt to use sound mitigation techniques to make the vehicle quieter. As is known, a wave that is in opposite phase of a first wave may cancel out the first wave. In the case of sound wave, the sound from a vehicle may be captured and a sound generator may create a sound in the opposite phase of the vehicle. Further, the sound mitigation may review a flight plan and anticipate changes in sound such as a call for increased prop speed. Such an increase may be anticipated and may be mitigated. As a result, the "buzzing" of tradition unmanned aircraft may be reduced or eliminated. Of course, other methods of reducing sound, such as insulation, are possible and are contemplated. Below is a pseudo code example for determining whether to initiate audio suppression. In the below example, the vehicle 100 may determine its distance relative to a geofence. If too close, then the vehicle 100 may determine that a change in flight plan may be required that involves a change in prop speed and noise suppression to counteract noise generated due to the change in prop speed.

```
Receive AudioGeoFence Table
LoadAudioGeoFence( )
For each Object in LoadGeoFence
Data Input
currentObject.Latitude=35.882234
currentObject.Longitude=-78.788222
currentObject.Altitude=30# meters
currentObject.Speed=16# meters/sec
currentObject.Track=93.6
currentObject.ID=4923# identifier of vehicle 100
AudioGeoFenceObject.Latitude=35.866864
AudioGeoFenceObject.Longitude=-78.799637
AudioGeoFenceObject.Height=20# meters
AudioGeoFenceObject.ID=000483# coded Airport code
   or Other Object
AudiogeoFenceRadius.Critical=4437.38# meters
AudiogeoFenceRadius.Warning=5046.72# meters
Calculate_Distance (currentObject, AudioGeoFenceObject)
constR=6371000.0# meters
phi_1=radians(currentObject.Latitude)
phi_2=radians(AudioGeoFenceObject.Latitude)
delta_phi=radians(AudioGeoFenceObject.Latitude-currentObject.Latitude)
delta_lambda=radians(AudioGeoFenceObject.Longitude-currentObject.Longitude)
```

Similar to the examples provided above, the vehicle 100 may use delta_phi and delta_lambda to determine a distance between itself and the geofence based on the curvature of the earth. The vehicle 100 may use the calculated distance to determine whether to initiate audio suppression.

```
Check_GeoFence (ResultRange, AudiogeoFenceRadius)
If ResultRange<AudiogeoFenceRadius.Critical
AudioSuppresisonEnable(AudiogeoFenceRadius.NoiseCancellationLevel)
```

Figure 11:
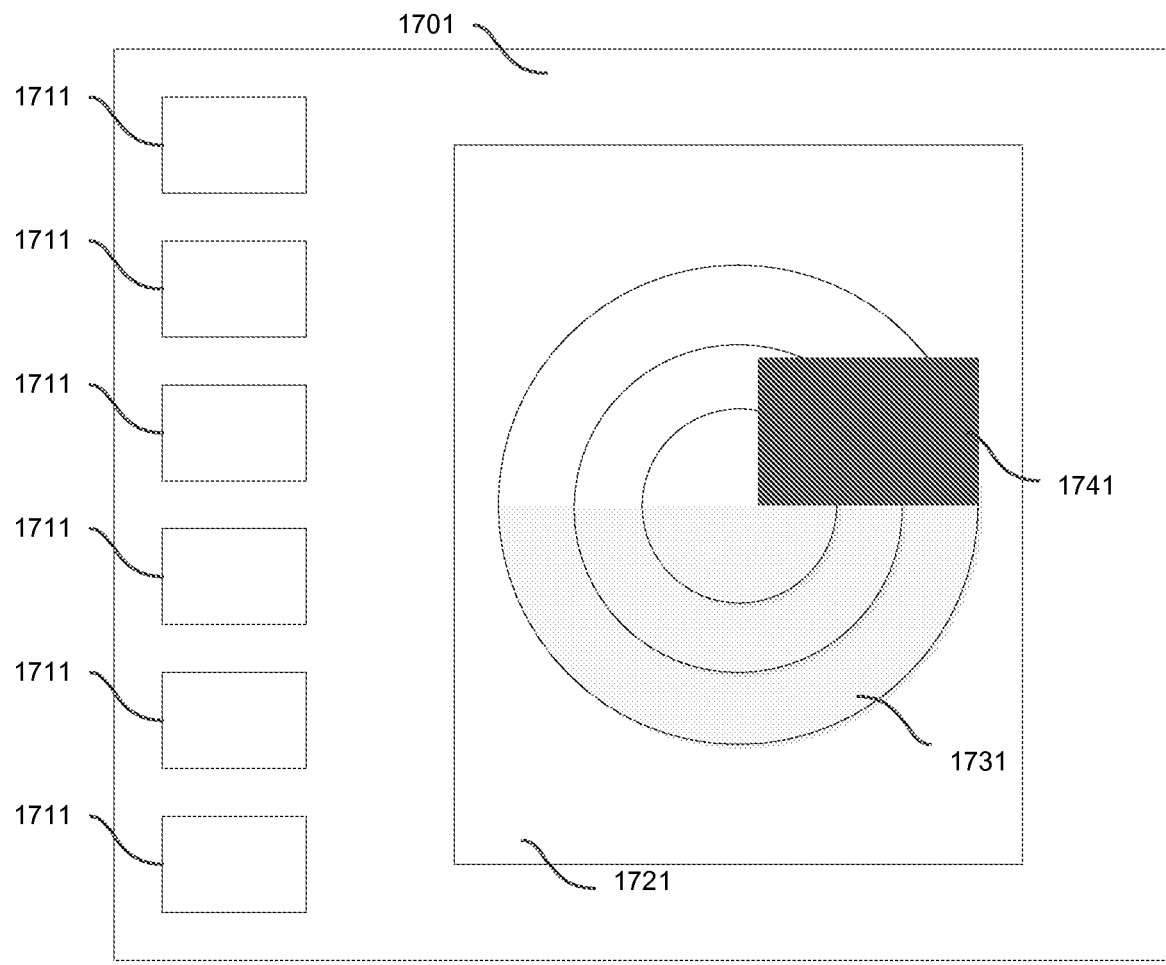
FIG. 11 may illustrate a user interface.

FIG. 11 may be an illustration of a sample back end user interface 1701. It may have a plurality of input areas 1701 which may be different activities. Flight plans may be submitted in a few clicks through a simple easy to use interface. The user may define a block of airspace in which the vehicle is planning to conduct travel much like a pilot of a manned aircraft would. This flight plan is received and parsed by the traffic management system servers 2222 and provides the user or pilot with an approval or denial for that flight based on a number of properties which are determined based upon nearby geofences and defined performance limitations for his/her certification and/or UAV platform.

The traffic management system 2222 may provide ground-based sense-and-avoid as a service to all vehicles such as small UAVs by informing each UAV of its surroundings both in the air and on the ground. Transmitted items may include but are not limited to terrain, tree lines, infrastructure (e.g., power lines, towers, windmills, etc.), buildings, manned aircraft, and other un-manned aircraft traffic. This ability to teach the vehicle its surroundings allows the system to provide high fidelity sense-and-avoid at a low cost in a small, lightweight package. Due to the type of information being ingested and parsed by the traffic management system 2222, the system may be able to classify various types of travel and conditions. The system may automatically escalate specific situations to a manned controller who may then provide further instruction to the vehicle system or notifications to the pilot through the included mobile applications or over the system through ground control software. Below is example pseudo code for providing ground-based sense-and-avoid as a service. In an example, the traffic management system 2222 may populate a sense-and-avoid data table containing information on vehicles within a particular airspace.

```
Load RealTime Sense and Avoid Data Table
realTimeData=LoadRealTimeData( )
sensorData=scanLocation( ) # Image based, Doppler,
   Infrared
For each RealTimeObject in realTimeData
Data Input
currentObject.Latitude=35.882234
currentObject.Longitude=-78.788222
currentObject.Altitude=30# meters
currentObject.Speed=16# meters/sec
currentObject.Track=93.6
currentObject.ID=4923# identifier for vehicle 100
RealTimeObject.Latitude=35.866864
```

RealTimeObject.Longitude=−78.799637
RealTimeObject.Height=18# meters
RealTimeObject.ID=000483# coded Airport code or Other Object
Calculate_Distance (currentObject, GeoFenceObject)
constR=6371000.0# meters
phi_1=radians(currentObject.Latitude)
phi_2=radians(GeoFenceObject.Latitude)
delta_phi=radians(GeoFenceObject.Latitude−currentObject.Latitude)
delta_lambda=radians(GeoFenceObject.Longitude−currentObject.Longitude)

The traffic management system 2222 may use delta_phi and delta_lambda to determine a distance between vehicle 100 and each additional vehicle 110, object, or geofence based on the curvature of the earth. This distance is referenced as "ResultRange" in the below pseudo code. The traffic management system 2222 may generate and maintain data to track a current location of each vehicle in a particular airspace.

Verify_RealTimeData (ResultRange, RealTimeObject)
For each sensorDataObject in SensorData
If RealTimeObject=sensorDataObject
notifyServerObjectVerifed(gps.Time, gps.Longitute,gps.Latitude)
If RealTimeObject is not Found
notifyServerNewObject(.Time, gps.Longitute,gps.Latitude, RealTimeObject)

Notifications may be communicated to users of the registered active vehicles travel plan through mobile computing devices. The notifications may alert the user in a number of travel situations. Notifications may range from potential breach of allocated space to early notice that a travel path should be changed in order to miss an obstacle prior to the system providing commands to the autopilot to take corrective actions. An interface may be provided which users or system managers may access to see and monitor flights in real time. This portal is similar in display to an air traffic controller's radar scope as illustrated in FIG. 11 which may include an illustration of the relevant area 1721, other vehicles within given distances 1731 of the vehicle and any geofenced areas 1741.

Certain embodiments are described herein as including logic or a number of components, modules, or mechanisms. Modules may constitute either software modules (e.g., code embodied on a non-transitory machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, may comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Still further, the figures depict preferred embodiments of a vehicle control system for purposes of illustration only. One skilled in the art will readily recognize from the foregoing discussion that alternative embodiments of the structures and methods illustrated herein may be employed without departing from the principles described herein. Thus, upon reading this disclosure, those of skill in the art will appreciate still additional alternative structural and functional designs for a system and a process for a low flying unmanned vehicle automatically avoiding collisions through the disclosed principles herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An apparatus for in-flight collision avoidance in independently-operating unmanned aerial vehicles, the apparatus comprising:
a processor and a memory, wherein the memory stores a set of machine-operable instructions operable, when executed by the processor, to:
receive first flight operational data at a first on-board computing system of a first unmanned aerial vehicle via a central computing system, wherein the first flight operational data corresponds to a first planned operation of the first unmanned aerial vehicle over a first area, and the first flight operational data controls the first unmanned aerial vehicle over the first area;
receive second flight operational data at the first computing system via the central computing system, wherein the central computing system is remote from both the first unmanned aerial vehicle and a second unmanned aerial vehicle and the second flight operational data controls the second unmanned aerial vehicle over a second area adjacent to the first area;
send a notification to a mobile computing device user interface of the central computing system upon determining the second flight operational data crosses a time threshold or a distance threshold with respect to the first flight operational data; and
allow a user to modify the first flight operational data for the first unmanned aerial vehicle before operating over the first area and the second flight operational data for the second unmanned aerial vehicle before operating over the second area at the mobile computing device user interface in response to the notification.

2. The apparatus of claim 1, wherein the memory stores further machine-operable instructions that are operable, when executed by the processor, to display the notification within a user interface of the first on-board computing system.

3. The apparatus of claim 1, wherein the memory stores further machine-operable instructions that are operable, when executed by the processor, to wirelessly communicate the first flight operational data, a modified first flight operational data, and the second flight operational data to a remote collection site.

4. The apparatus of claim 3, wherein the memory stores further machine-operable instructions that are operable to wirelessly communicate the first flight operational data, the modified first flight operational data, and the second flight operational data in an ADS-b communication format when an altitude of the first unmanned aerial vehicle is equal to or greater than 1500 feet and in a cellular communication format when the altitude of the first unmanned aerial vehicle is less than 1500 feet.

5. The apparatus of claim 3, wherein the memory stores further machine-operable instructions that are operable, when executed by the processor, to determine relevant object data at the on-board computing device, wherein the relevant object data is within the second area and over the threshold.

6. The apparatus of claim 5, wherein the second flight operational data wirelessly communicated to the remote collection site includes the relevant object data.

7. The apparatus of claim 1, wherein the second flight operational data further corresponds to a manned aerial vehicle.

8. A system for in-flight collision avoidance in independently-operating unmanned aerial vehicles, the system comprising:
an on-board computing system for operation of a first unmanned aerial vehicle over a first area, wherein the first computing system includes a first processor, a first memory, and a first communication device for sending and receiving wireless communication, the first memory includes, for the first unmanned aerial vehicle, first flight operational data corresponding to the first unmanned aerial vehicle within the first area; and
a central computing system for operation of a second unmanned aerial vehicle over a second area, wherein the second area is adjacent to the first area, the central computing system is remote from both the first unmanned aerial vehicle and the second unmanned aerial vehicle and includes a second processor, a second memory, and a second communication device for sending and receiving wireless communication, the second memory includes, for the second unmanned aerial vehicle, second flight operational data corresponding to the second unmanned aerial vehicle and for controlling the second unmanned aerial vehicle within the second area;
wherein the first memory further stores a set of machine-operable instructions operable, when executed by the first processor, to:
receive the second flight operational data at the on-board computing system via the central computing system;
send a notification to a mobile computing device user interface of the central computing system upon determining the second flight operational data crosses a time threshold or a distance threshold with respect to the first flight operational data; and
allow a user to modify the first flight operational data for the first unmanned aerial vehicle before operating over the first area and the second flight operational data for the second unmanned aerial vehicle before operating over the second area at the mobile computing device user interface in response to the notification.

9. The system of claim 8, wherein the first memory stores further machine-operable instructions that are operable, when executed by the processor, to display the notification within a user interface of the first computing system.

10. The system of claim 8, wherein the second memory stores further machine-operable instructions that are operable, when executed by the second processor, to wirelessly communicate the first flight operational data, a modified first flight operational data, and the second flight operational data to a remote collection site.

11. The system of claim 10, wherein the second memory stores further machine-operable instructions that are operable, when executed by the second processor, to wirelessly communicate the first flight operational data, the modified first flight operational data, and the second flight operational data in an ADS-b communication format when an altitude of the first unmanned aerial vehicle is equal to or greater than 1500 feet and in a cellular communication format when the altitude of the first unmanned aerial vehicle is less than 1500 feet.

12. The system of claim 10, wherein the second memory stores further machine-operable instructions that are operable, when executed by the second processor, to determine relevant object data at the second computing device, wherein the relevant object data is within the second area and over the threshold.

13. The system of claim 12, wherein the second flight operational data wirelessly communicated to the remote collection site includes the relevant object data.

14. The system of claim 8, wherein the second flight operational data further corresponds to a manned aerial vehicle.

15. A computer-implemented method for in-flight collision avoidance in independently-operating aerial vehicles, the method comprising:
receive first flight operational data at a first on-board computing system of a first unmanned aerial vehicle via a central computing system, wherein the first flight operational data corresponds to a first planned operation of the first unmanned aerial vehicle over a first area, and the first flight operational data controls the first unmanned aerial vehicle over the first area;
receiving second flight operational data at the first computing system via the central computing system, wherein the central computing system is remote from both the first unmanned aerial vehicle and a second unmanned aerial vehicle and the second flight operational data controls the second unmanned aerial vehicle over a second area adjacent to the first area;
sending a notification to a mobile computing device user interface of the first central computing system upon determining the second flight operational data crosses a time threshold or a distance threshold with respect to the first flight operational data; and
allow a user to modify the first flight operational data for the first unmanned aerial vehicle before operating over the first area and the second flight operational data for the second unmanned aerial vehicle before operating over the second area at the mobile computing device user interface in response to the notification.

16. The computer-implemented method of claim 15, further comprising displaying the notification within a user interface of the first computing system.

17. The computer-implemented method of claim 15, further comprising wirelessly communicating the first flight operational data, a modified first flight operational data, and the second flight operational data to a remote collection site.

18. The computer-implemented method of claim 17, further comprising wirelessly communicating the first flight operational data, the modified first flight operational data, and the second flight operational data in an ADS-b communication format when an altitude of the first unmanned aerial vehicle is equal to or greater than 1500 feet and in a cellular communication format when the altitude of the first unmanned aerial vehicle is less than 1500 feet.

19. The computer-implemented method of claim 17, further comprising determining relevant object data at the second computing device, wherein the relevant object data is within the second area and over the threshold.

20. The computer-implemented method of claim 19, wherein the second flight operational data wirelessly communicated to the remote collection site includes the relevant object data.

21. The computer-implemented method of claim 15, wherein the second flight operational data further corresponds to a manned aerial vehicle.

* * * * *